United States Patent
Rose et al.

(10) Patent No.: US 9,908,163 B1
(45) Date of Patent: Mar. 6, 2018

(54) METAL PLATE BENDING APPARATUS AND METHOD

(71) Applicant: Industrial Design & Fabrication, Inc., McEwen, TN (US)

(72) Inventors: David Bruce Rose, Waverly, TN (US); Billy Keith Willhite, Hurricane Mills, TN (US); William Brian Travis, Burns, TN (US)

(73) Assignee: Industrial Design & Fabrication, Inc., McEwen, TN (US)

(*) Notice: Subject to any disclaimer, the term of this patent is extended or adjusted under 35 U.S.C. 154(b) by 0 days.

(21) Appl. No.: 15/584,886

(22) Filed: May 2, 2017

(51) Int. Cl.
   *B21D 5/04* (2006.01)
   *B21D 5/00* (2006.01)
   *G01B 11/26* (2006.01)
   *B21D 7/022* (2006.01)

(52) U.S. Cl.
   CPC ............ *B21D 5/042* (2013.01); *B21D 5/006* (2013.01); *B21D 5/04* (2013.01); *B21D 7/022* (2013.01); *G01B 11/26* (2013.01)

(58) Field of Classification Search
   CPC .......... B21D 5/042; B21D 5/006; B21D 5/04; B21D 7/022; G01B 11/26
   USPC ........................................................ 72/319
   See application file for complete search history.

(56) References Cited

U.S. PATENT DOCUMENTS

| | | | | | |
|---|---|---|---|---|---|
| 4,282,735 | A | * | 8/1981 | Break | B21D 5/042 72/319 |
| 4,909,059 | A | * | 3/1990 | King | B21D 7/022 492/3 |
| 5,582,053 | A | * | 12/1996 | Chubb | B21D 5/04 72/294 |

* cited by examiner

*Primary Examiner* — David B Jones
(74) *Attorney, Agent, or Firm* — Waller Lansden Dortch & Davis LLP; Eric B. Fugett; Blake M. Bernard

(57) ABSTRACT

An apparatus for bending a metal work piece, the apparatus including a press support frame and a bending anvil disposed on the press support frame. A clamp press can be mounted to the press support frame, the clamp press positioned to selectively clamp the work piece over the bending anvil when the work piece is positioned on the bending anvil. A bending press unit can be mounted to the press support frame, the bending press unit including a bending roller oriented to engage the work piece during a bending operation when the work piece is clamped over the bending anvil. The bending press unit is operable to move the bending roller with respect to the press support frame in a first direction and a second direction, the first direction being substantially perpendicular to the second direction. A method of bending a metal work piece with the bending apparatus.

19 Claims, 20 Drawing Sheets

METAL PLATE BENDING APPARATUS AND METHOD

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to bending machines for bending work pieces.

More particularly, the present disclosure relates to bending machines for bending metal work pieces, and particularly for bending metal plates having a relatively large thickness, such as those metal plates having a thickness that is greater than or equal to ⅜ of an inch. Such plates can be made from steel, iron, copper, etc. A great amount of force can be required to bend such metal plates in order to form various metal shapes. In one application, thick steel plates can be bent to a desired shape and used as spring plates for suspension systems on larger and heavier vehicles such as commercial trucks and trailers, construction vehicles, large dump trucks, military vehicles, etc.

Conventional bending methods for such thick metal plates can include placing the metal plate over a bending anvil, and applying a bending force on the metal plate to conform the metal plate to the shape of the bending anvil. Because of the large amount of force needed to bend thicker metal plates, the bending force is generally applied in a cantilevered fashion, with the force applied at a substantial distance from the anvil where bending occurs, in order to increase the leverage and moment applied to the metal plate by the bending force. Doing so can help reduce the force and energy needed to bend the metal plate. However, separating the bending force from the point of bending can allow the metal plate to bend, bow, twist, or deflect along a length of the plate between the bending anvil and the application point for the bending force. Such bending can cause the edges of the metal plate to flare or bevel, and particularly at the bend site, which is undesirable.

Additionally, conventional machines for bending thick metal plates such as wipe dies and press brake dies utilize forming or bending punches that apply the bending force to the metal plate. However, such bending punches are configured such that they produce friction forces on a surface of the metal plate as the bending force is applied to the metal plate. Because of the large bending force required to bend the thick metal plates, the friction forces produced during bending can negatively affect the surface integrity of the plates and can cause deformation points on the metal plate which can produce a localized failure point in the final product that can adversely affect the lifespan of the final product. Such failure points can also produce a safety hazard if the products fail unexpectedly during use.

Additionally, such applied friction forces can deform or damage the edges of predrilled holes or recesses formed in the metal plate prior to bending. As such, the desired holes or recess often must be reformed after the bending process is complete, which can be cumbersome and is generally undesirable.

What is needed then are improvements to bending machines, and particularly for bending machines for thick metal plates.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is an apparatus for bending a metal work piece, the apparatus including a press support frame and a bending anvil disposed on the press support frame. A clamp press can be mounted to the press support frame, the clamp press positioned to selectively clamp the work piece over the bending anvil when the work piece is positioned on the bending anvil. A bending press unit can be mounted to the press support frame, the bending press unit including a bending roller oriented to engage the work piece during a bending operation when the work piece is clamped over the bending anvil. The bending press unit is operable to move the bending roller with respect to the press support frame in a first direction and a second direction, the first direction being substantially perpendicular to the second direction.

Another aspect of the present disclosure is an apparatus for bending a metal work piece, the apparatus including a press support frame and a bending anvil movably disposed on the support frame. A clamp press can be mounted to the press support frame, the clamp press positioned to selectively clamp the work piece over the bending anvil when the bending anvil is positioned beneath the clamp press and the work piece is positioned on the bending anvil. A bending press unit can be mounted to the press support frame, the bending press unit including a bending roller oriented to engage the work piece during a bending operation when the work piece is clamped over the bending anvil. The bending press unit can include a first press actuator and a second press actuator, the first press actuator operable to move the bending roller with respect to the press support frame in a vertical direction, the second press actuator operable to move the bending roller with respect to the press support frame in a horizontal direction.

Another aspect of the present disclosure is a method for bending a metal work piece, the method comprising the steps of (a) providing a bending apparatus including a press support frame, a bending anvil disposed on the support frame, a clamp press mounted to the press support frame; and a bending press unit movably mounted to the press support frame, the bending press unit including a bending roller rotatably disposed on the bending press unit; (b) placing a work piece on the bending anvil with an end of the work piece cantilevered from a distal end of the bending anvil, the work piece having a thickness of at least about ⅜ of an inch; (c) clamping the work piece to the bending anvil with the clamp press, the clamp press applying a clamping force of at least about 100,000 pounds on the work piece; and (d) bending the work piece against the distal end of the bending anvil with the bending roller of the bending press unit, the bending roller rolling down the work piece as the work piece is bent, wherein the bending press unit applies a bending force on the work piece via the bending roller of at least 100,000 pounds, the bending force producing a moment arm about a point on the distal end of the bending anvil from which the work piece is cantilevered, the moment arm having a length that is less than or equal to about 3 inches.

One objective of the present disclosure is to provide a bending apparatus and method of bending for thicker metal plates having a thickness greater than or equal to about ⅜ of an inch.

Another objective of the present disclosure is to help reduce friction forces applied to a metal work piece during a bending operation.

Another object of the present disclosure is to help reduce deformation and distortion of a metal work piece during a bending operation.

Another objective of the present disclosure is to provide a bending apparatus having interchangeable bending anvils.

Numerous other objects, advantages and features of the present disclosure will be readily apparent to those of skill in the art upon a review of the following drawings and description of a preferred embodiment.

DETAILED DESCRIPTION

Figure 1:
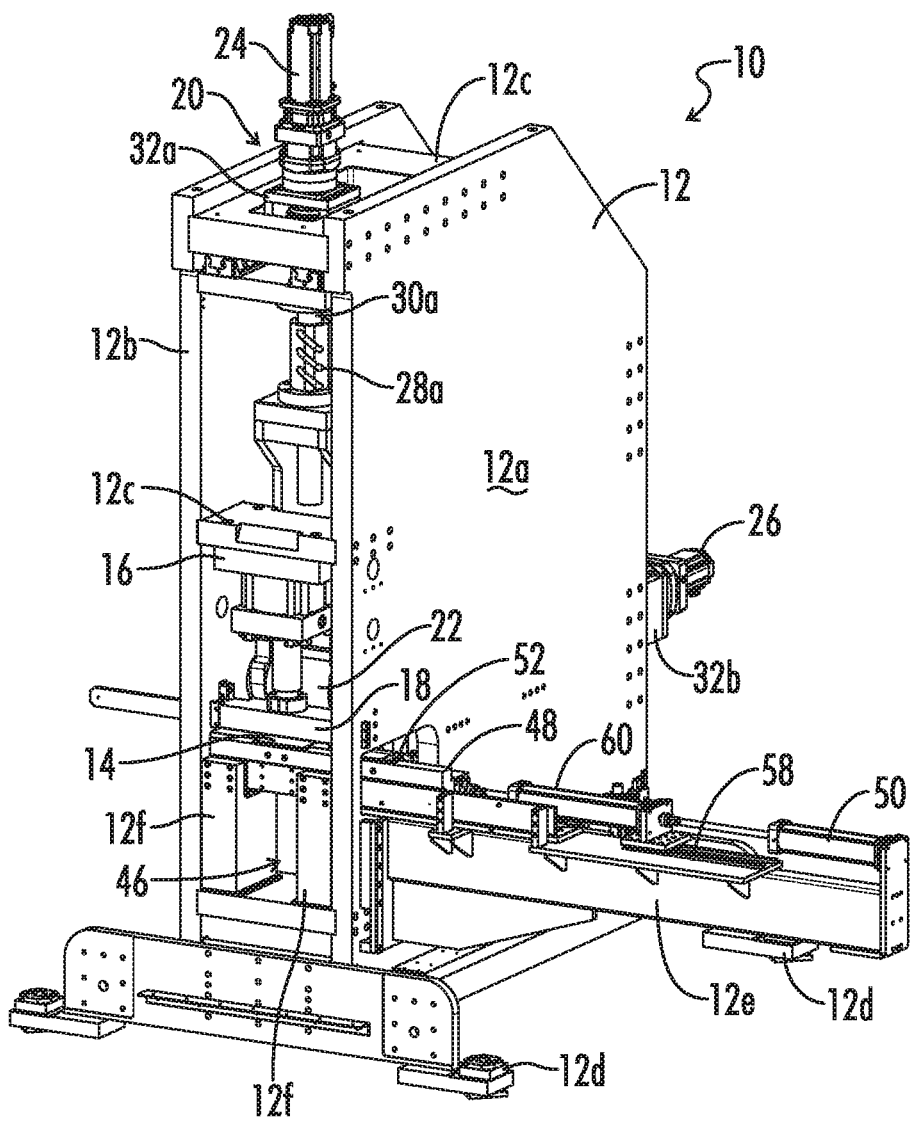
FIG. 1 is a perspective view of a bending apparatus of the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

Figure 2:
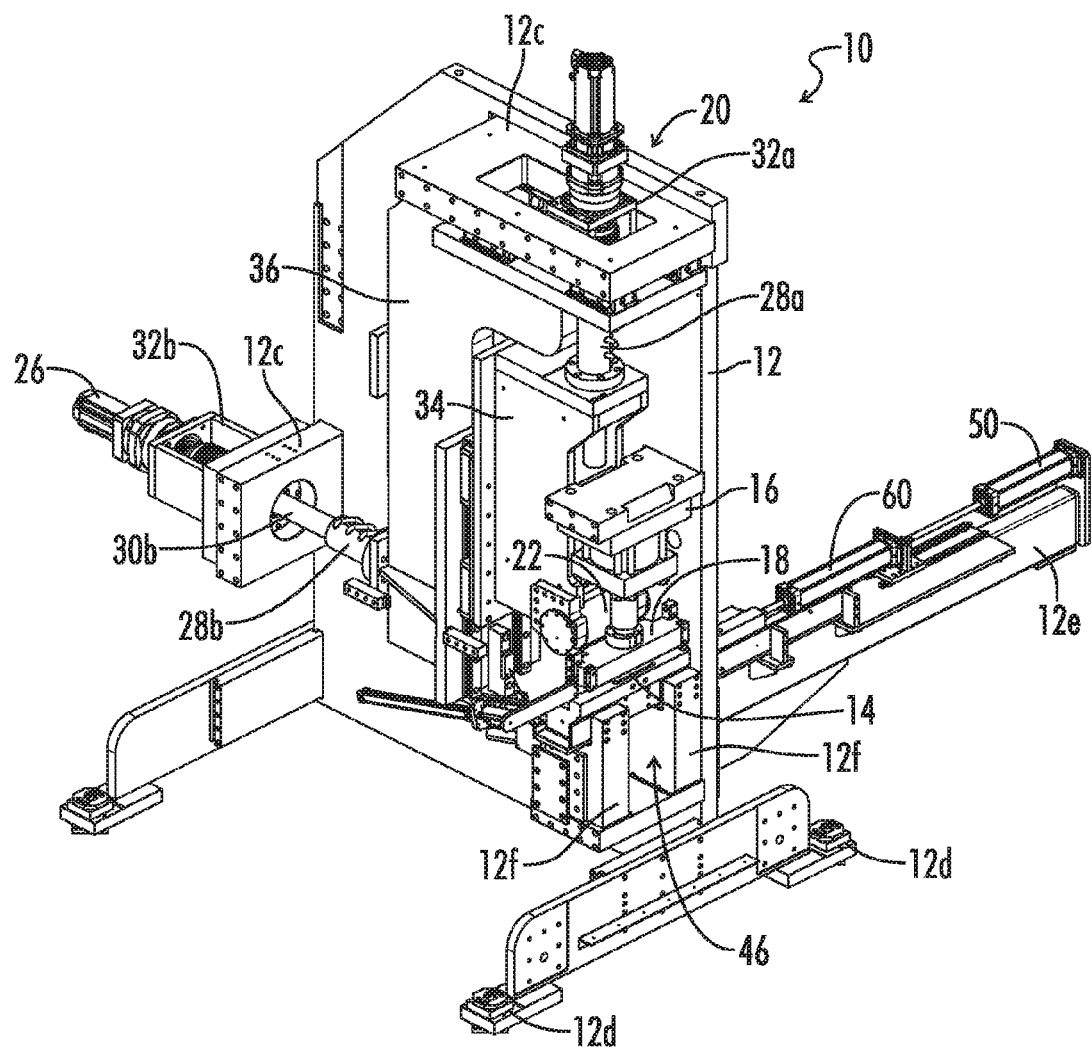
FIG. 2 is a perspective view of the bending apparatus of FIG. 1 with a side panel of a press support frame removed.
Figure 3:
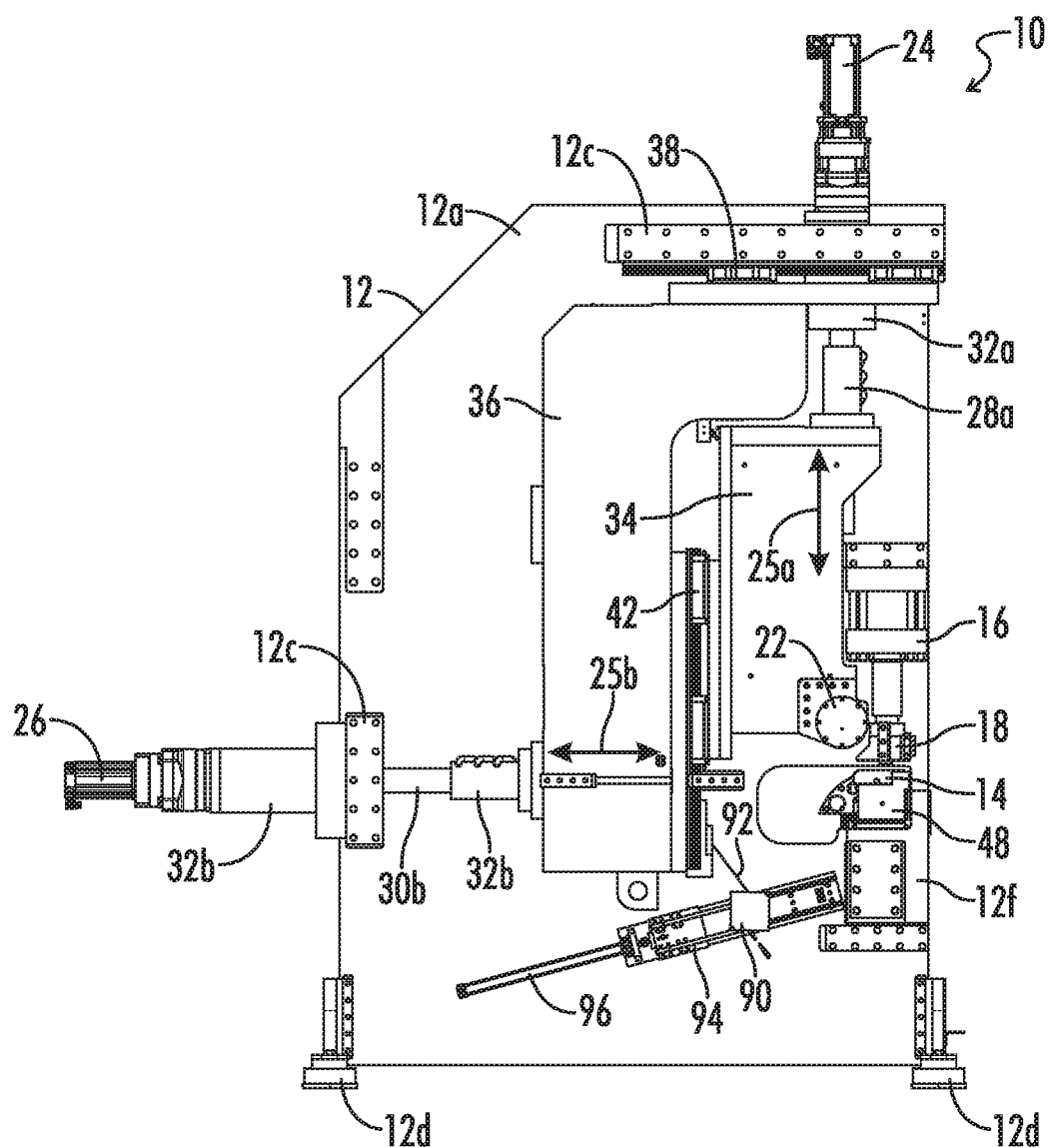
FIG. 3 is a side view of the bending apparatus of FIG. 2.

An embodiment of a bending apparatus 10 for bending a metal work piece is shown in FIGS. 1-3. The bending apparatus 10 can include a press support frame 12. Press support frame 12 can include a first side panel 12a, a second side panel 12b, and one or more cross supports 12c spanning between the first and second side panels 12a and 12b. The press support frame 12 can generally provide structural integrity and support for the bending apparatus 10 and the components contained thereon. In some embodiments, press support frame 12 can include one or more adjustable feet 12d which can include screws or other suitable adjustment mechanisms for adjusting the height of the individual feet. Such adjustable feet 12d can be useful when bending apparatus 10 is positioned on an uneven or slightly slanted floor. The feet 12d can be adjusted to maintain a level orientation of the bending apparatus 10 with respect to a horizontal plane.

Bending apparatus 10 can include a bending anvil 14 disposed on the press support frame 12. A clamp press 16 can be mounted to the press support frame 12. The clamp press 16 can be positioned to selectively clamp a work piece over the bending anvil 14 when the work piece is positioned on the bending anvil 14. The clamp press 16 can include a clamp pad 18 that can be pressed against a work piece positioned on the bending anvil 14 to clamp the work piece to the bending anvil 14. In some embodiments, the clamp press 16 can be a hydraulically powered press, hydraulic lines being run to a piston chamber within the clamp press 16, the hydraulic fluid selectively forcing and retracting the clamp pad 18 toward and away from the bending anvil 14 and the work piece positioned thereon. In other embodiments, the clamp press 16 can be a pneumatically powered clamping press or a motorized clamping press including a screw drive, ball screw, or jack screw type actuation mechanism.

A bending press unit 20 can be mounted to the press support frame 12. The bending press unit 20 can include a bending roller 22. The bending roller 22 can be oriented on the bending press unit 20 to engage the work piece clamped on the bending anvil 14 during a bending operation when the work piece is positioned on and clamped over the bending anvil 14.

The bending press unit 20 can be operable to move the bending roller 22 with respect to the support frame 12. During a bending operation, as the bending roller 22 is moved by the bending press unit 20, the bending roller 22 can engage a top surface of the work piece to produce a generally downward force on the work piece. The bending roller 22 can be pivotally connected to the bending press unit 20 such that the bending roller is free to rotate on the bending press unit 20. As such, as the bending roller 22 engages with the work piece, the bending roller 22 can roll across the surface of the work piece as the work piece bends and the engagement point between the work piece and the roller can shift as the bending roller 22 rolls down the work piece. Having a bending roller 22 engage the work piece during a bending operation can help reduce damage to the work piece. The bending roller 22 can help reduce friction forces applied on the work piece as the bending press unit 20 and the bending roller 22 bend the work piece. In some embodiments, the bending roller 22 can help eliminate entirely any friction forces applied on the work piece as the bending press unit 20 and the bending roller 22 bend the work piece. Such a configuration is an improvement over current devices for bending thick metal plates where bending punches slide across a work piece, the friction produced by such a sliding motion of the bending punches potentially causing damage or deformation to the work piece during a bending operation.

Additionally, the reduced friction forces when a bending roller 22 is used can help maintain the structural integrity of any holes, apertures, or recesses defined in a work piece during the bending operation. The edges of such holes, apertures, or recesses often times are often prone to deformation or damage when friction forces are applied across a surface of the work piece and across the holes, apertures, and recesses defined therein. Maintaining the shape and integrity of any such holes, apertures, and recesses can help reduce the need to redefine or reform such features after the bending process is completed.

Referring now to FIG. 3, in some embodiments, the bending press unit 20 can be operable to move the bending roller 22 in a first direction and in a second direction. In some embodiments, the first direction can be substantially perpendicular to the second direction, such that motion of the bending roller 22 in a given direction can be made independently of motion in the second direction. In some embodiments, bending press unit 20 can be operable to move the bending roller 22 in generally horizontal and a generally vertical direction. In some embodiments, the bending press unit 20 can be operable to move the bending roller 22 in a horizontal and vertical direction simultaneously as desired to produce an angled or curved motion of the bending roller 22 during a bending operation.

Being able to move the bending roller 22 via bending press unit 20 in multiple directions can be helpful for several reasons. Firstly, thick metal plates, such as thick steel plates, can have a spring like quality such that upon bending, once the bending force is removed, the metal can spring back some distance such that the desired bend angle is not maintained. For instance, in a ninety degree bend, if a bending press were to move in a single vertical direction to produce a 90 degree bend, once the bending force is removed, the metal plate would likely spring back to orient itself at an angle that is less than 90 degrees. The bending press unit 20 being operable to move bending roller 22 in two directions including both a vertical and a horizontal direction 25a and 25b can be useful to overcome such a problem. Once the bending roller 22 has made its initial downward motion, the bending roller 22 can be forced inward in a horizontal direction 25b to bend the plate past the desired ninety degree bend, such that when the bending force is removed the metal plate can spring back to the desired 90 degree orientation.

Another benefit of having a bending press unit 20 that can move the bending roller 22 in two directions is that during the bending operation, as the bending roller 22 moves in the vertical direction 25a, the bending roller 22 can also move in the horizontal direction 25b as desired to maintain a relatively consistent moment on the work piece during bending. The bending roller 22 during at least a portion of the bending operation can move along an angled or curved bending roller path that can conform to and contour the shape of the a distal end of the bending anvil 14 across which the work piece is bent. Providing a curved or angled bend roller path for the bend roller 22 during a bending operation can help maintain a generally uniform distance between the point of engagement between the bending roller 22 and the work piece where the bending force is applied and the point of contact between the work piece and the bending anvil 14 about which the work piece is being bent and from which the work piece is being cantilevered out from the bending anvil 14.

In some embodiments, as shown in FIG. 3, the bending press unit 20 can include a first press actuator 24 operable to selectively move the bending roller 22 in a first or vertical direction 25a. The bending press unit 20 can also include a second press actuator 26 operable to selectively move the bending roller 22 in a second or horizontal direction 25b. The first and second press actuators 24 and 26 can each include an electrical ball screw press actuator. Each press actuator 24 and 26 can include a corresponding ball nut 28a and 28b, the ball nuts 28a and 28b disposed on corresponding ball screws 30a and 30b which can be driven by corresponding motors 32a and 32b respectively. Each ball nut 28a and 28b can translate along the corresponding ball screw 30a and 30b as the corresponding ball screw 30a and 30b is driven by the corresponding motor 32a and 32b to produce a force on the bending press unit 20 to move the bending roller 22 in the first or second directions respectively as desired. In other embodiments, the first and second press actuators 24 and 26 can be driven by hydraulic or pneumatic power to produce the desired force and movement on the bending press unit 20.

In some embodiments, the bending press unit 20 can include a bending roller support 34. The bending roller 22 can be rotatably disposed on the bending roller support 34. Bending roller 22 can be rotatably mounted on bending roller support 34 via a plurality of roller bearings that allow bending roller 22 to freely rotate on bending roller support 34. Bending press unit 20 can also include a roller support frame 36. The roller support frame 36 can be movably mounted to the press support frame 12. The bending roller support 34 can also be movably mounted on the roller support frame 36 such that as the roller support frame 36 moves on the press support frame 12, the bending roller support 34 and the bending roller 22 can also move relative to the press support frame 12 along with the roller support frame 36.

Figure 4:
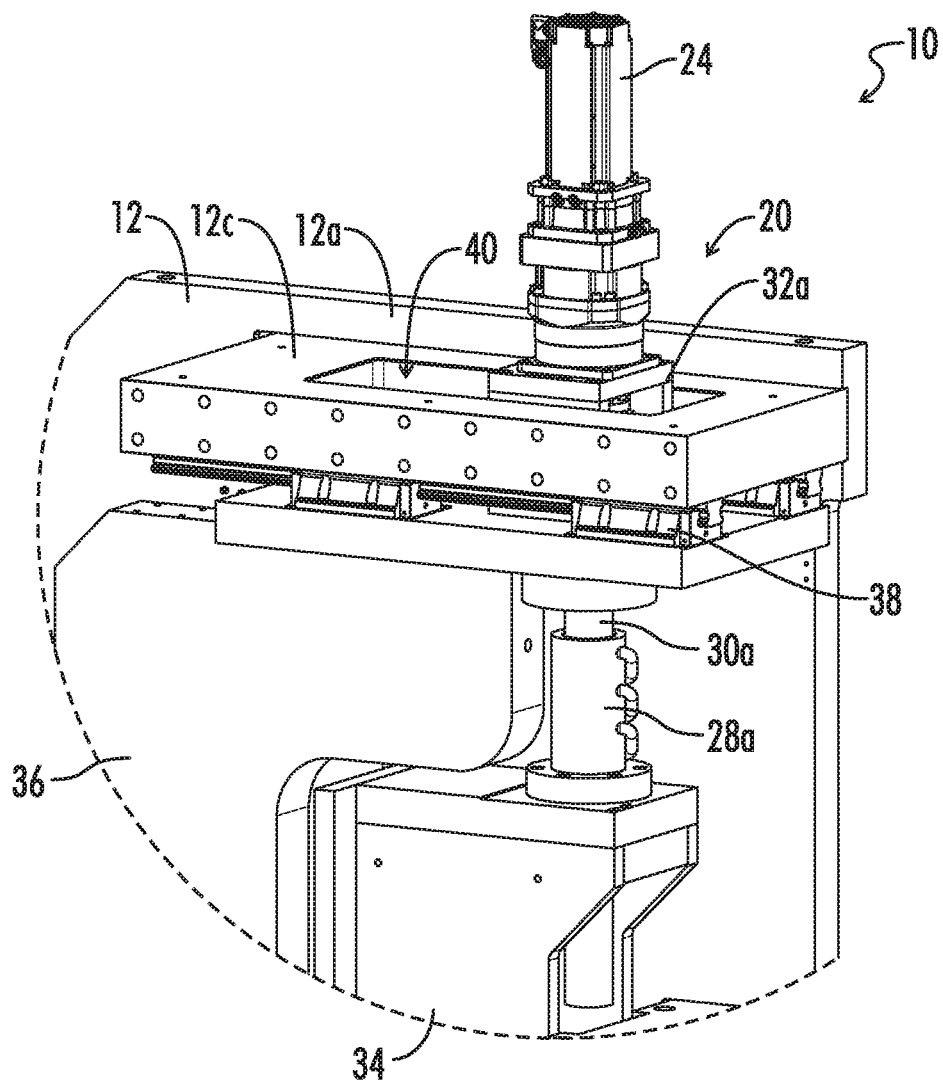
FIG. 4 is a detailed perspective view of a horizontal rail assembly for the bending press unit of the bending apparatus of FIG. 3.

A detailed view of the mounting mechanism for the roller support frame 36 is shown in FIGS. 3 and 4. The top cross support 12c for the press support frame 12 can extend between the two side panels of the press support frame 12, and the roller support frame 36 can be movably mounted to the top cross support 12c. In some embodiments, a first rail assembly 38 can be coupled between the roller support frame 36 and the top cross support 12c of the press support frame 12 such that the roller support frame is movable relative to the press support frame 12. The second press actuator 26 can be mounted to the press support frame 12 and the second ball nut 30b can be coupled to the roller support frame 36 such that as the second press actuator 26 is operated to move the second ball nut 28b along the second ball screw 30b, the roller support frame 36 can be forced to move in a horizontal direction 25b on first rail assembly 38 to move bending roller support 34 and bending roller 22 positioned on the roller support frame 36 in a horizontal direction 25b.

In some embodiments, top cross support frame 12c can include a first press actuator aperture or channel 40 in which first press actuator 24 can extend through. As the second press actuator 26 is operated to move the roller support frame 36 on the first rail assembly 38, the first press actuator 24 can slide along first press actuator aperture 40 such that the first press actuator 24 does not interfere with the movement of the roller support frame 36 and the horizontal movement, or movement in the second direction 25b, of the bending roller 22.

Figure 5:
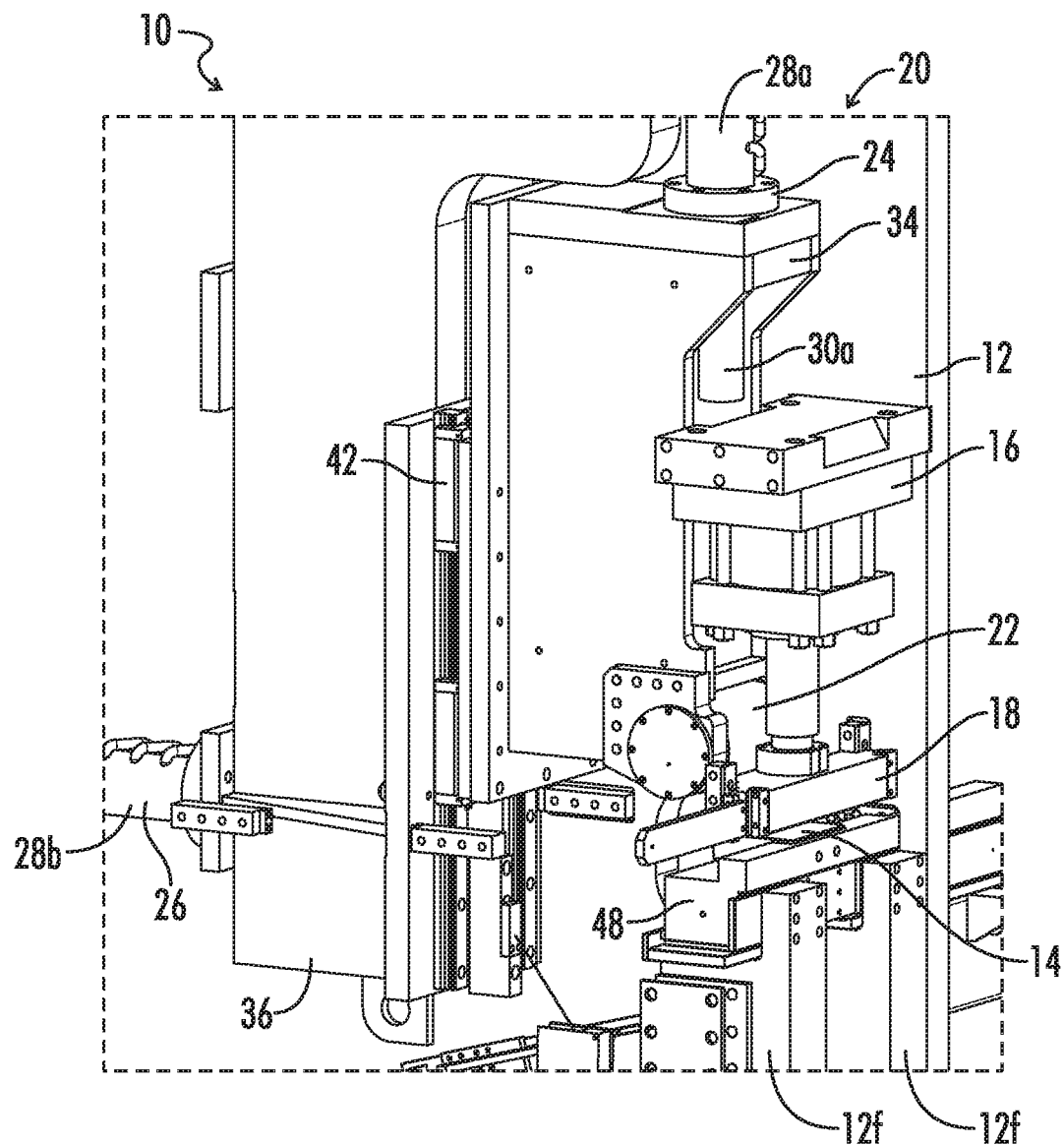
FIG. 5 is a detailed perspective view of a vertical rail assembly for the bending press unit of the bending apparatus of FIG. 3.

A detailed view of the mounting mechanism for the bending roller support 34 onto the roller support frame 36 is shown in FIGS. 3 and 5. A second rail assembly 42 can be coupled between the bending roller support 34 and the roller support frame 36 such that bending roller support 34 is movably mounted on the roller support frame 36. The second rail assembly 42 can be oriented in a vertical direction such that bending roller support 34 is vertically movable on roller support frame 36. The first press actuator 24 can be mounted to the roller support frame 36 and the first ball screw nut 28a can be coupled to the bending roller support 34. As such, as the first ball nut 28a translates on the first ball screw 30a as first motor 32a is driven when the first press actuator 24 is selectively operated, the bending roller support 34 is forced to move vertically or in a first direction 25a on the second rail assembly 42 with respect to the roller support frame 36.

As such, first press actuator 24 can be operable to move bending roller support 34 and bending roller 22 vertically or in a first direction 25a with respect to roller support frame 36, and second press actuator 26 can be operable to move roller support frame 36, bending roller support 34, and bending roller 22 horizontally or in a second direction 25b with respect to press support frame 12. The first and second press actuators 24 and 26 can thus work in conjunction with one another to produce bidirectional movement of the bending roller 22 on bending press unit 20.

Figure 5A:
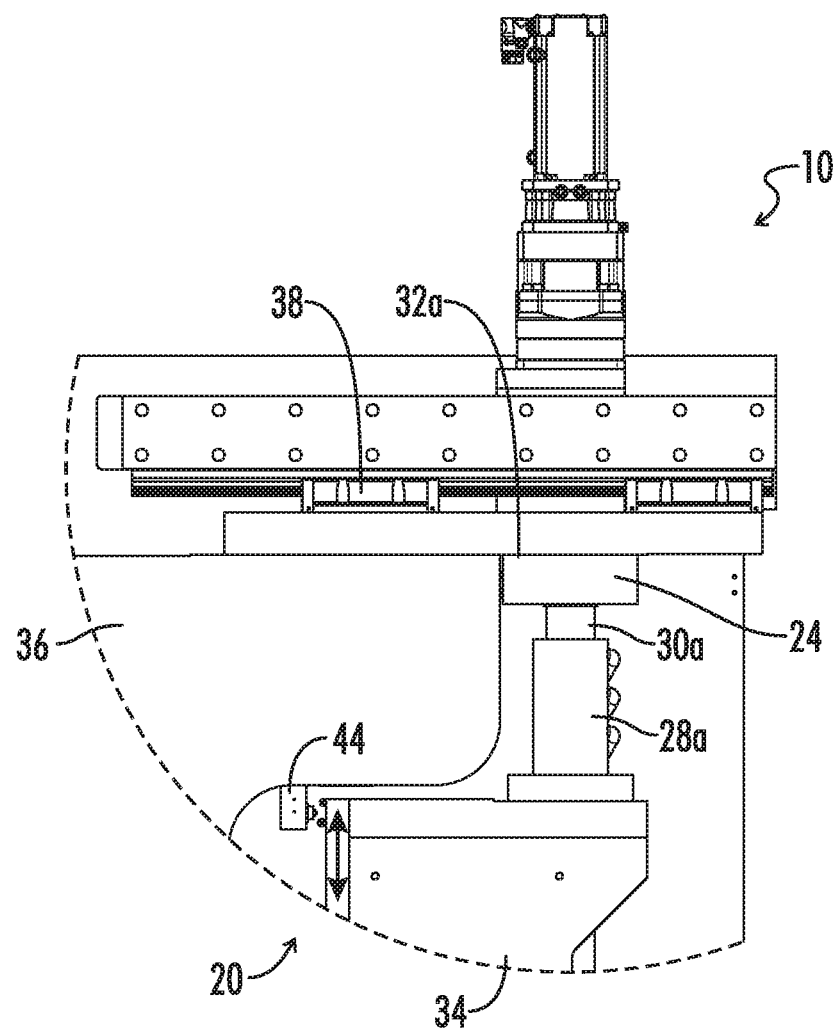
FIG. 5A is a detailed side view of the bending apparatus of FIG. 2 showing a vertical limit switch of the bending press unit.

Referring to FIG. 5A, in some embodiments, the bending press unit 20 can include a vertical limit switch 44 disposed between the roller frame support 36 and the bending roller support 34. The limit switch 44 can be a variety of different types of sensors. The limit switch 44 can be configured to stop motion of the first press actuator 24 and the bending roller support 34 at a desired location, such as in when the bending roller support 34 is at a maximum height relative to the roller support frame 36. In one embodiment, the limit switch 44 is an inductive proximity sensor utilizing magnetic objects positioned on the bending roller support 34 that interfere with the electrical signal in the limit switch 44 positioned on the roller support frame 36 when the magnetic objects are in a desired position relative to the limit switch 44. In other embodiments, the limit switch 44 can be any suitable limit switch, including but not limited to a push button, cam, lever, roller plunger, or reed type switch. Additionally, in some embodiments, the bending press unit 20 can contain a similar horizontal limit switch coupled between the press support frame 12 and the roller support frame 36. The horizontal limit switch can be configured to stop the movement of the second press actuator and the roller support frame 36 when the roller support frame 36 reaches a desired horizontal location, such as a desired forward most horizontal position toward the bending anvil, in order to help prevent damage to the clamp press, bending anvil, and/or other components of the bending apparatus 10.

Figure 6:
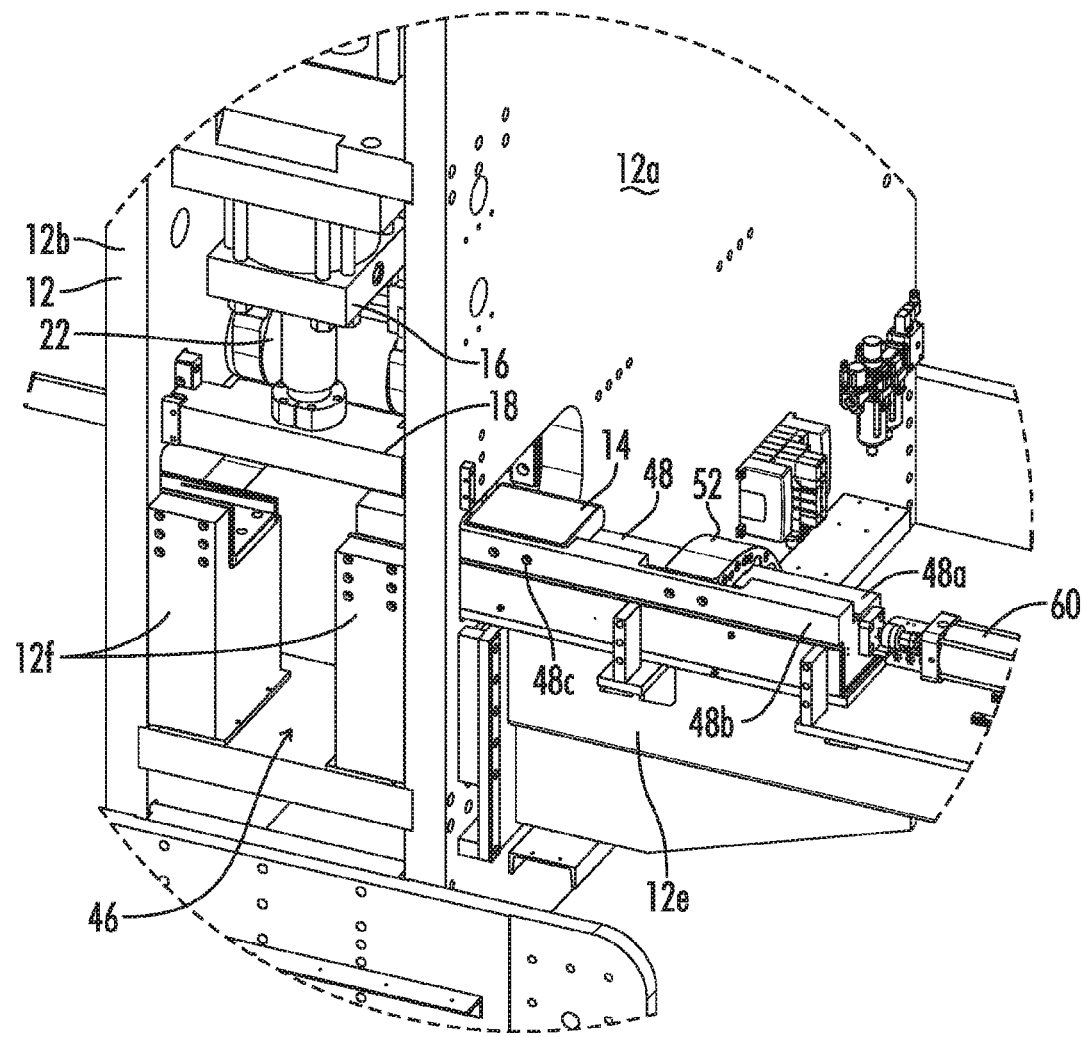
FIG. 6 is a detailed view of an anvil holder of the bending apparatus of FIG. 1 in a retracted position.
Figure 7:
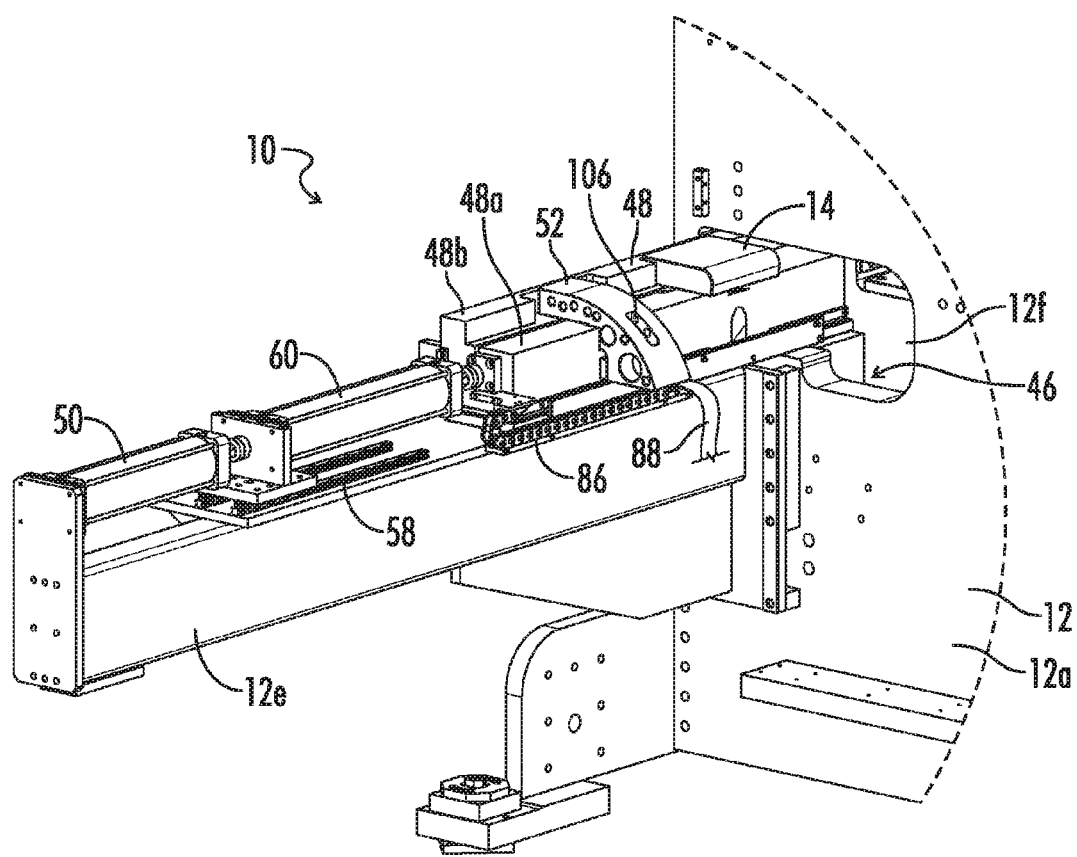
FIG. 7 is a detailed perspective view of the anvil holder and first and second bending anvil actuators of the bending apparatus of FIG. 1.

Referring now to FIGS. 6 and 7, in some embodiments, the bending anvil 14 can be movably disposed on the press support frame 12. In such embodiments, press support frame 12 can include an anvil support extension 12e extending laterally from one of the side panels 12a and 12b of the press support frame. The bending anvil 14 can be slidably disposed on the anvil support extension 12e. The press support frame 12 can also include bending anvil supports 12f which can support opposing sides of the bending anvil 14 when the bending anvil 14 is positioned beneath the clamp press 16. A gap 46 can be located between the bending anvil supports 12f, such that a work piece being bent past a ninety degree angle around a bending anvil 14 can be force into the gap 46 positioned between the bending anvil supports 12f. Bending anvil 14 in some embodiments can be slidably disposed on the anvil support extension 12e such that bending anvil 14 can be moved to and from a bending position on the bending anvil supports 12f. For some articles of manufacture that require multiple bends, it may be beneficial to be able to remove the bending anvil 14 from the bending position on bending anvil supports 12f such that gap 46 is clear for a work piece being bent to be more readily moved or rearranged in position on the bending apparatus 10 for the next bend.

In some embodiments, bending apparatus 10 can include an anvil holder 48 slidably disposed on the press support frame 12 and specifically on the anvil support extension 12e and/or the bending anvil supports 12f. The bending anvil 14 can be mounted onto the anvil holder 48, and the anvil holder 48 can be slidably disposed on the anvil support extension 12e, such that the bending anvil 14 is slidably disposed on the press support frame 12 via the bending anvil holder 48. The bending anvil holder 48 can slide on the press support frame 12 to move the bending anvil 14 to and from a bending position on bending anvil supports 12f beneath clamp press 16. The anvil support extension 12e and the bending anvil supports 12f can include channels or receptacles for slidingly receiving the anvil holder 48. In some embodiments, bending apparatus 10 can include a first bending anvil actuator 50 mounted to the press support frame 12 and coupled with the anvil holder 48. The first bending anvil actuator 50 can be operable to move the anvil holder 48 on the press support frame 12 such that the bending anvil 14 is moved to and from the bending position on bending anvil supports 12f beneath clamp press 16. When the first bending anvil actuator 50 is retracted, the bending anvil 14 can be removed from the bending position over the gap 46, as shown in FIGS. 6 and 7. When the first bending anvil actuator 50 is actuated, the anvil holder 48 can move to the position shown in FIG. 8 with the bending anvil 14 in the bending position beneath the clamp press 16.

In some embodiments, the bending anvil 14 can be removably mounted to the anvil holder 48, for instance by removable screws or bolts, such that bending anvils 14 having different shapes, sizes, and bending angles can be utilized on bending apparatus 10. Having removable and interchangeable bending anvils 14 can allow bending apparatus 10 to be used to produce various bent metal articles. Bending anvils 14 can be switched out on bending apparatus 10 to produce a different product or work piece. In some embodiments, the anvil holder 48 can have a generally L-shaped or stepped profile, the bending anvil 14 resting on a lower extension or step 48a of the anvil holder 48, the bending anvil 14 being secured to the anvil holder via the upper extension or step 48b of the anvil holder 48. One or more bolts or screws can extend threw one or more anvil fastener holes 48c in the upper extension 48b of the anvil holder 48 to removably mount the bending anvil 14 to the anvil holder 48.

Figure 22A:
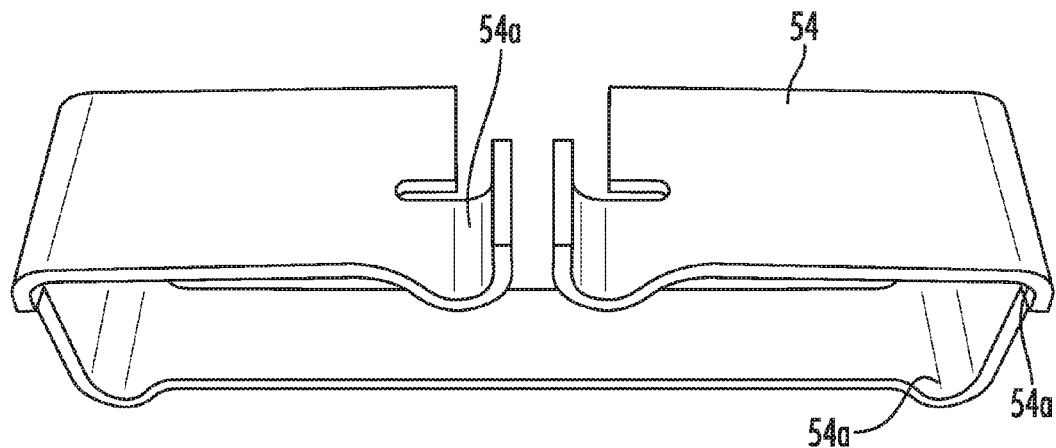
FIG. 22A is a perspective view of an exemplary work piece design after completion of multiple bending iterations using the bending apparatus of FIG. 8 and the first bending anvil.
Figure 22B:
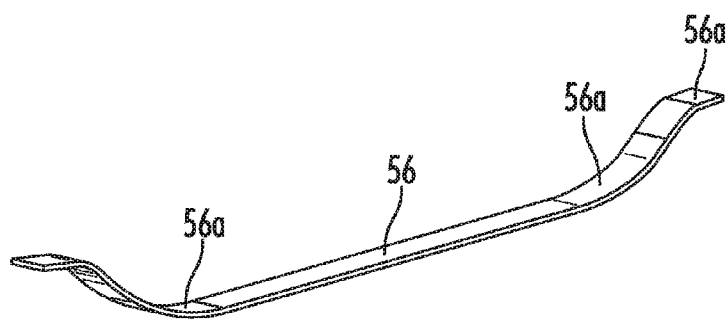
FIG. 22B is a perspective view of an exemplary work piece design after completion of multiple bending iterations using the bending apparatus of FIG. 14 and the second bending anvil.

In some embodiments, the bending apparatus 10 can include a second bending anvil 52 mounted to the anvil holder 48 such that the second bending anvil 52 is slidably disposed on the press support frame 12 via the anvil holder 48 as previously described. In some embodiments, both the first and second bending anvils 14 and 52 can be removably or interchangeably mounted on the anvil holder 48. As such, bending apparatus 10 can be equipped with two bending anvils 14 and 52 at a time, which can be beneficial for articles being bent that have more than one bend type or characteristic. Additionally, having a bending apparatus 10 equipped with multiple bending anvils 14 and 52 can allow multiple parts to be made with the same bending apparatus 10. For instance, suspension systems for large or heavy vehicles such as commercial trucks and tractor trailers, dump trucks, heavy machinery, etc. can include spring boxes 54 as shown in FIG. 22A and lower plates 56 as shown in FIG. 22B. The spring boxes 54 can include multiple ninety degree bends 54a having a radius of 30 millimeters, and the lower plates 56 can include several obtuse bends 56a having a radius of three inches. Different bending anvils are thus needed to produce the products in FIGS. 22A and 22B. A bending apparatus 10 having the ability to mount multiple anvils 14 and 52 on the anvil holder 48 can allow the same bending apparatus to be used to produce both products without having to have a second unit on hand, or require a user to switch out anvils on the anvil holder 48 between bends for the different products, the anvil holder 48 can simply be moved on the press support frame 12 and anvil support extension 12e such that the desired anvil 14 or 52 is placed in the bending position under the clamp press 16.

Referring again to FIGS. 6 and 7, in some embodiments including two bending anvils 14 and 52 mounted to the anvil holder 48, the bending apparatus 10 can include a first bending anvil actuator 50 and a second bending anvil actuator 60. The first bending anvil actuator 50 can be mounted to the press support frame 12 and particularly to the anvil support extension 12e, and the second bending anvil actuator 60 can be movably mounted to the press support frame 12 and the anvil support extension 12e. The second bending anvil actuator 60 can be coupled to the anvil holder 48, and the first bending anvil actuator 50 can be coupled to the second bending anvil actuator 60, such that the first bending anvil actuator is 50 is coupled to the anvil holder via the second bending anvil actuator 60. The second bending anvil actuator 60 in some embodiments can be mounted on an anvil actuator rail assembly 58 such that when the first bending anvil actuator 50 is actuated, the first bending anvil actuator 50 can force the second bending anvil actuator 60 to move on the anvil actuator rail assembly 58. The first and second bending anvil actuators 50 and 60 in some embodiments can be pneumatically actuated pistons. In other embodiments, first and second bending anvil actuators 50 and 60 can be hydraulically actuated pistons. In still other embodiments, first and second bending anvil actuators 50 and 60 can be linear actuators or screw type actuators.

Figure 8:
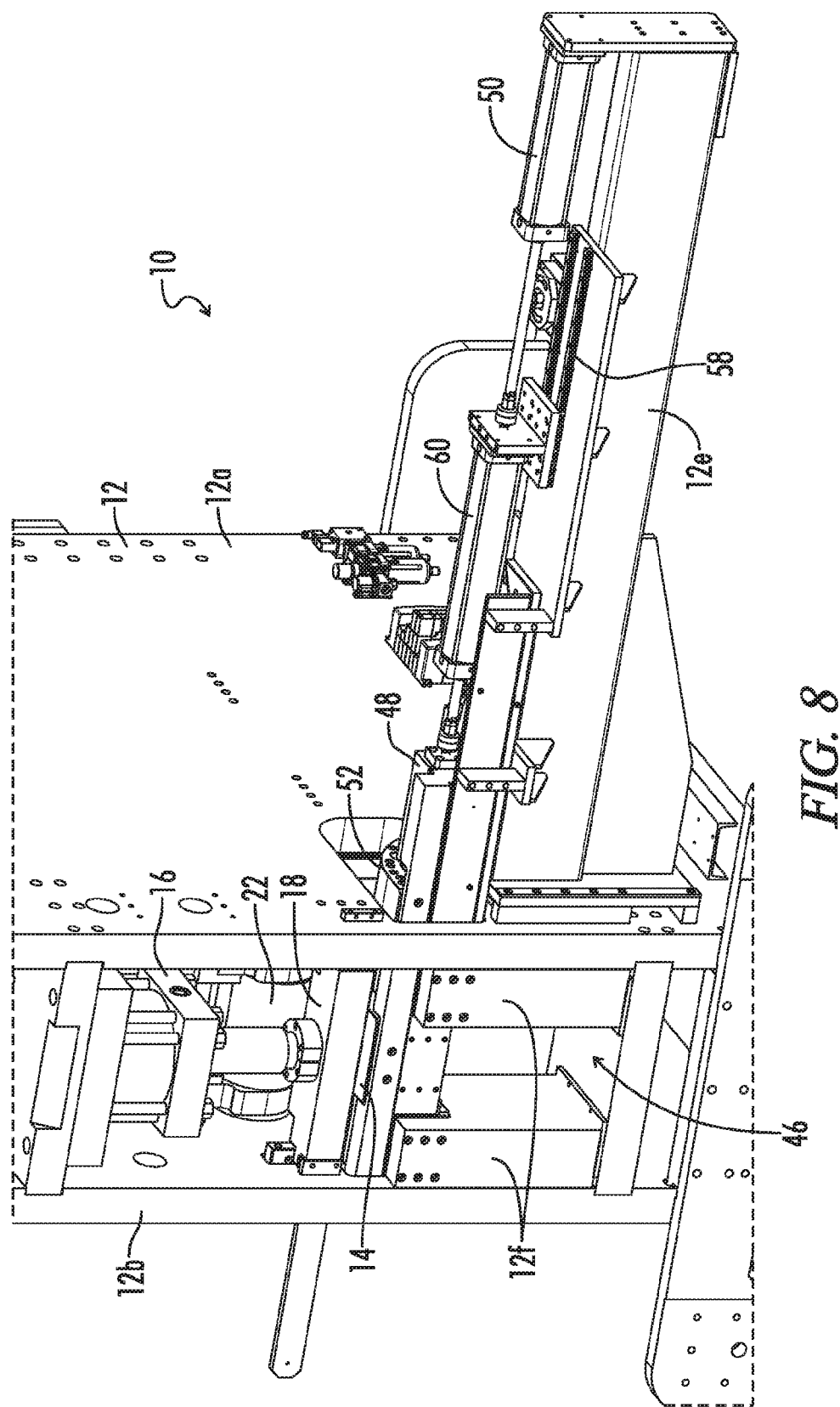
FIG. 8 is a detailed perspective view of the first bending anvil actuator of FIG. 7 after actuation and a first bending anvil positioned beneath a clamp press adjacent a bending roller of the bending apparatus.
Figure 14:
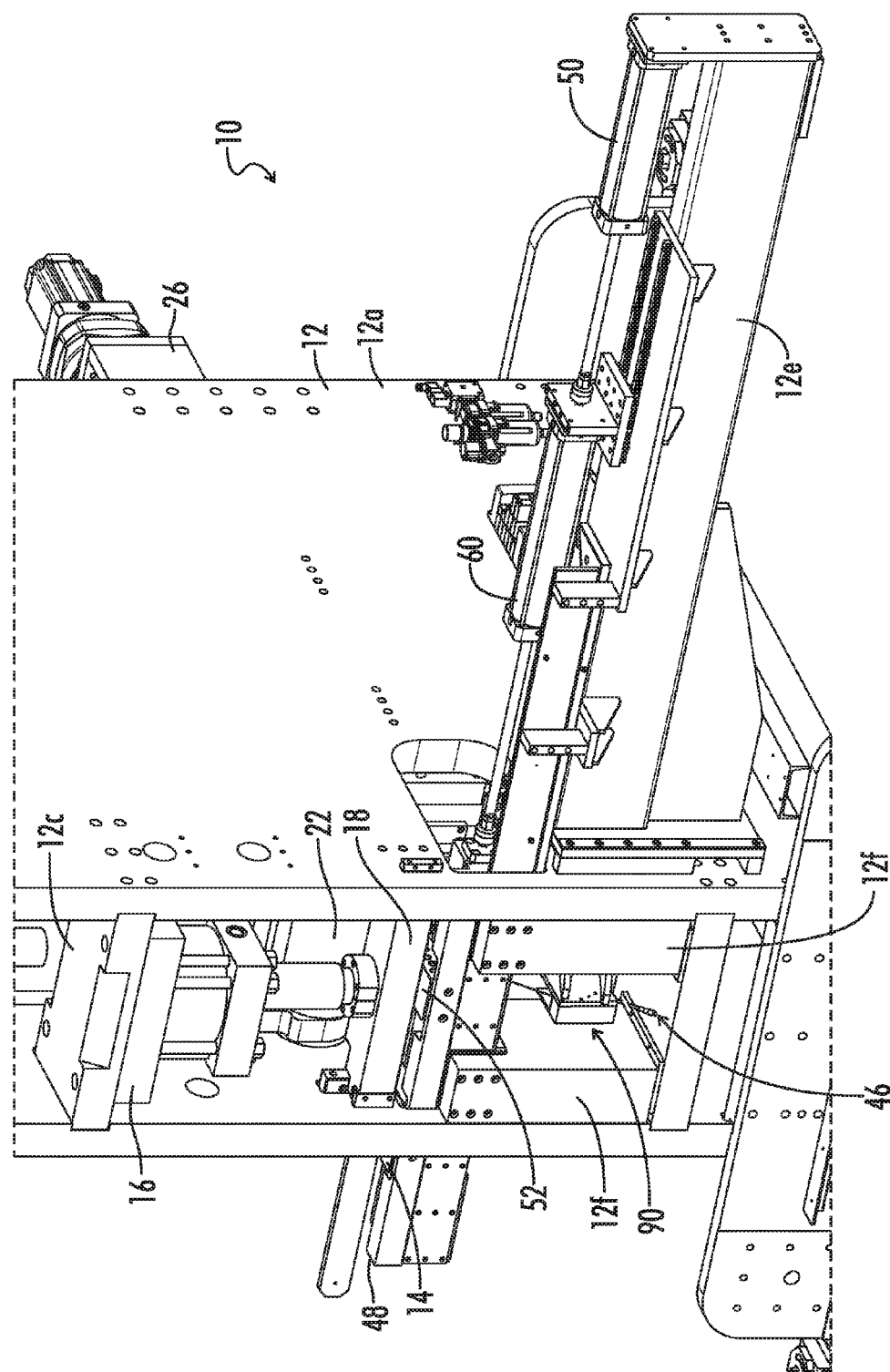
FIG. 14 is a detailed perspective view of the bending apparatus of FIG. 8 after actuation of the second bending anvil actuator, the second bending anvil positioned beneath the clamp press and adjacent the bending roller.

When both of the first and second bending anvil actuators 50 and 60 are in a retracted position, the anvil holder 48 and the first and second anvil 14 and 52 can be clear of the bending anvil supports 12f. The first bending anvil 50 is operable, as shown in FIG. 8, to move the second bending anvil actuator 60 and the anvil holder 48 to a position where the first bending anvil 14 is in the bending position beneath the clamp press 16. The second bending anvil actuator 50 is further operable to move the anvil holder 48 to a position wherein the second bending anvil 52 is positioned in the bending position beneath the clamp press 16, as shown in FIG. 14. As such, first and second bending anvil actuators 50 and 60 can be used in combination to move either the first or second anvil 14 and 52 to a position beneath the clamp press 16.

In other embodiments, the apparatus 10 can be configured such that second bending anvil actuator 60 can be actuated first to move anvil holder 48 to a position wherein first bending anvil 14 is positioned in the bending position beneath the clamp press 16, and first bending anvil actuator 50 can subsequently be actuated to move second bending anvil actuator 60 and anvil holder 48 to a position wherein second anvil second bending anvil 52 is in the bending position beneath clamp press 16. Having second bending anvil actuator 60 actuate first can allow first and second bending anvil actuators 50 and 60, and any pneumatic or hydraulic lines connected thereto, to remain in a constant located, second bending anvil actuator 60 only moving on anvil support extension 12e when it is desired to position second bending anvil 52 beneath clamp press 16. Reducing the movement of second bending anvil actuator 60 can help reduce any damage to or catching of pneumatic or hydraulic lines connected to second bending anvil actuator 60 as second bending anvil actuator 60 moves on anvil support extension 12e.

In some embodiments, anvil holder 48 can include 3 or more bending anvils. In some embodiments, 3 or more corresponding bending anvil actuators can be included on anvil support extension, the actuators operable in various combinations to position the various bending anvils beneath the clamp press 16. In other embodiments, anvil holder 48 can be coupled to a single linear actuator or anvil holder 48 can be positioned on an anvil holder track. A single programmable servo motor can power the linear actuator or the anvil holder track to move the anvil holder 48 to corresponding positions with various bending anvils positioned beneath the clamp press 16.

Figure 9:
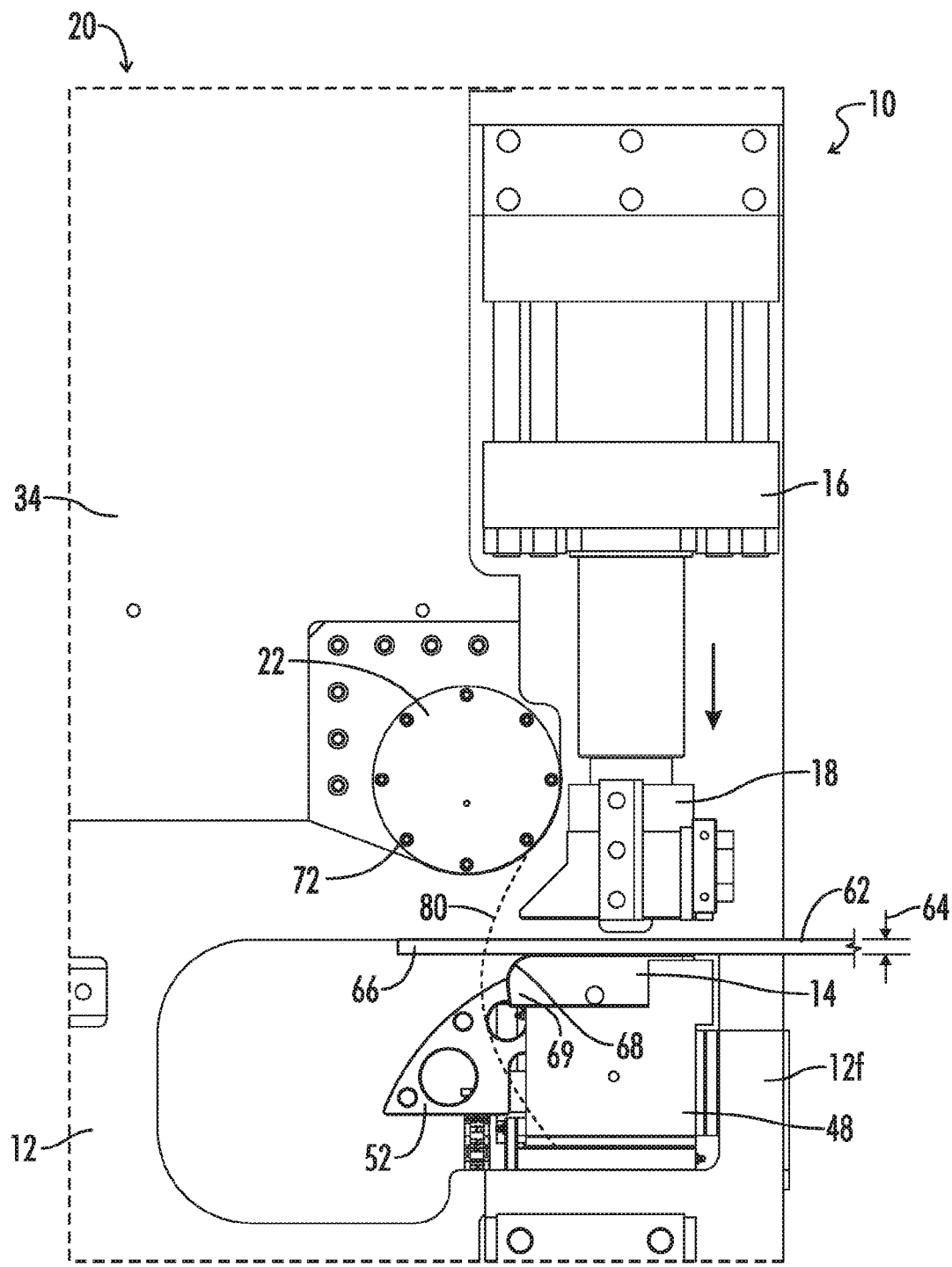
FIG. 9 is a detailed side view of a work piece positioned beneath a clamp press of the bending apparatus of FIG. 2 prior to clamping of the work piece on a bending anvil.
Figure 10:
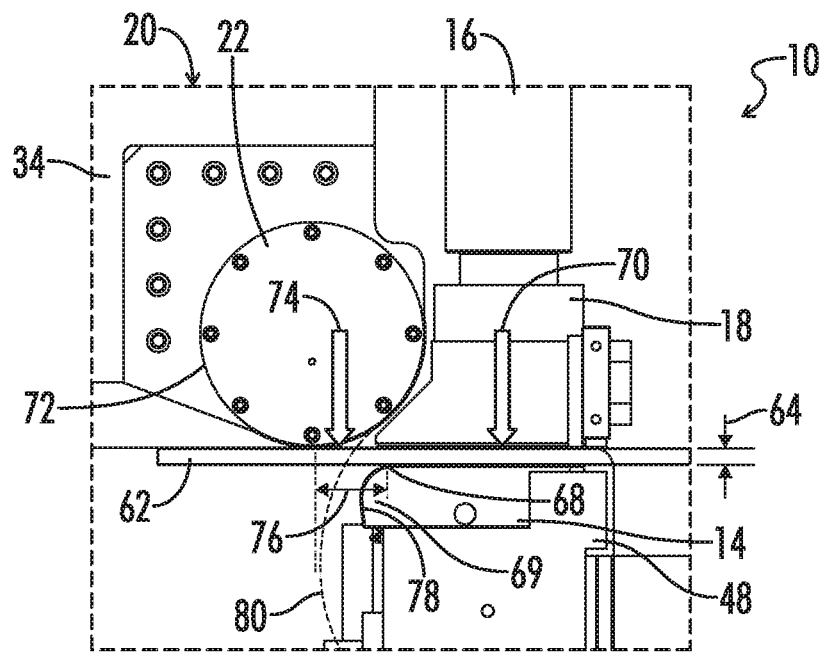
FIG. 10 is a detailed side view of the bending apparatus of FIG. 9 with a bending roller in an initial engagement position with the work piece during a bending operation.

A bending operation using first anvil 14 is shown in FIGS. 9-13. The bending anvil 14 shown can be used to produce a bend in a work piece 62 having a radius of about thirty millimeters. Initially as shown in FIG. 9, a work piece 62 such as a metal plate having a thickness 64 greater than or equal to about ⅜ of an inch can be placed on bending anvil 14 such that an end 66 of the work piece 62 is cantilevered from the bending anvil 14. In some embodiments, the thickness 64 of the metal work piece 62 can be between ⅜ of an inch and ¾ of an inch. In other embodiments, the thickness 64 of the metal work piece 62 can be greater than or equal to about 3.4 of an inch. The work piece 62 can extend in a cantilevered fashion from a bending point 68 on the distal end 69 of the bending anvil 14. The clamp press 16 can be actuated as shown in FIG. 10 to provide a clamping force 70 on the work piece 62 to clamp the work piece 20 against the bending anvil 14 in a desired position. The bending press unit 20 can then be actuated to engage a circumferential edge 72 of the bending roller 22 with the work piece 62 to initiate the bending sequence, the bending roller 22 applying a bending force 74 on the work piece 62. In the initial engagement position, a lower portion of the circumferential edge 72 of the bending roller 22 can engage the work piece 62 such that the bending force 74 can be applied in a generally downward direction. The bending force 74 can produce a moment arm 76 about the bending point 68 on the distal end 69 of the bending anvil 14, the moment arm 76 having a length that is less than or equal to about three inches. In some embodiments, the moment arm 76 can have a length that is less than or equal to about 1 inch.

Figure 11:
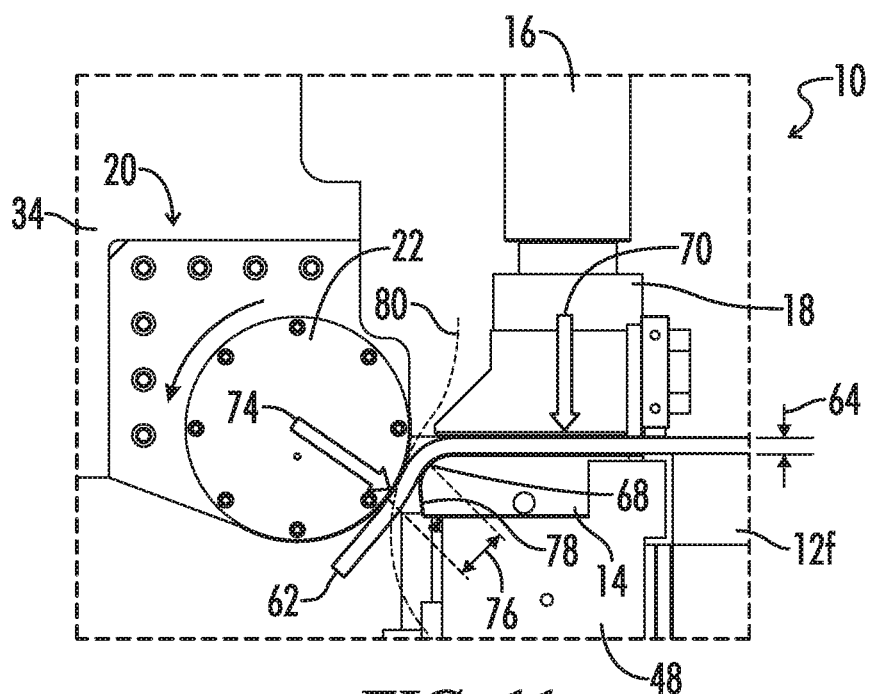
FIG. 11 is a detailed side view of the bending apparatus of FIG. 10 with the bend roller in an intermediate engagement position with a partially bent work piece during the bending operation.

As the bending force 74 is applied to the work piece 62, the work piece 62 can be bent about the distal end 69 of the bending anvil 14, as shown in FIG. 11. As the work piece is bent, the bending roller 22 can roll down the work piece 62 in order to reduce the amount of friction exerted on the work piece 62 by the bending roller 22 as previously described. As the work piece 62 is bent about the distal end 69 of the bending anvil 14, the bending point 68, or the point on the bending anvil 14 from which the work piece 62 is cantilevered, can shift along an outer rounded surface 78 of the bending anvil 14.

During the bending process, the length of the moment arm 76 can remain less than or equal to about 3 inches until the bending roller 22 is substantially past the bending anvil 14. Maintaining a relatively small moment arm 76 between the point of contact between the bending roller 22 and the work piece 62 and the bending point 68 on the bending anvil 14 can help reduce air bending or twisting and distortion of the work piece 62 along a portion of the work piece 62 positioned between the bending roller 22 and the bending anvil 14 during the bend. The bending roller 2 can apply a large bending force very near the point of bending on the work piece. Such a configuration can help maintain the profile and shape of the work piece 62 at the bend location and prevent the lateral edges of the work piece from flaring upward during the bend, which is undesirable.

Figure 12:
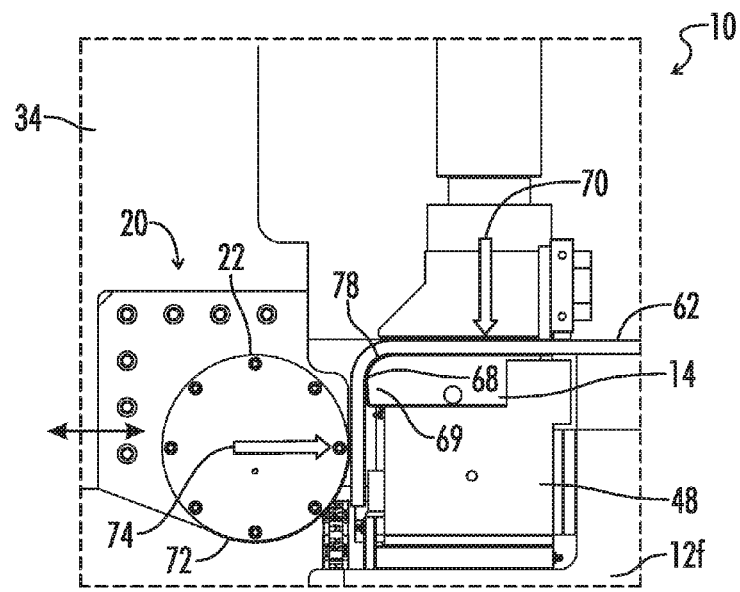
FIG. 12 is a detailed side view of the bending apparatus of FIG. 11 with the bending roller in a lower engagement position with a bent work piece during the bending operation.
Figure 13:
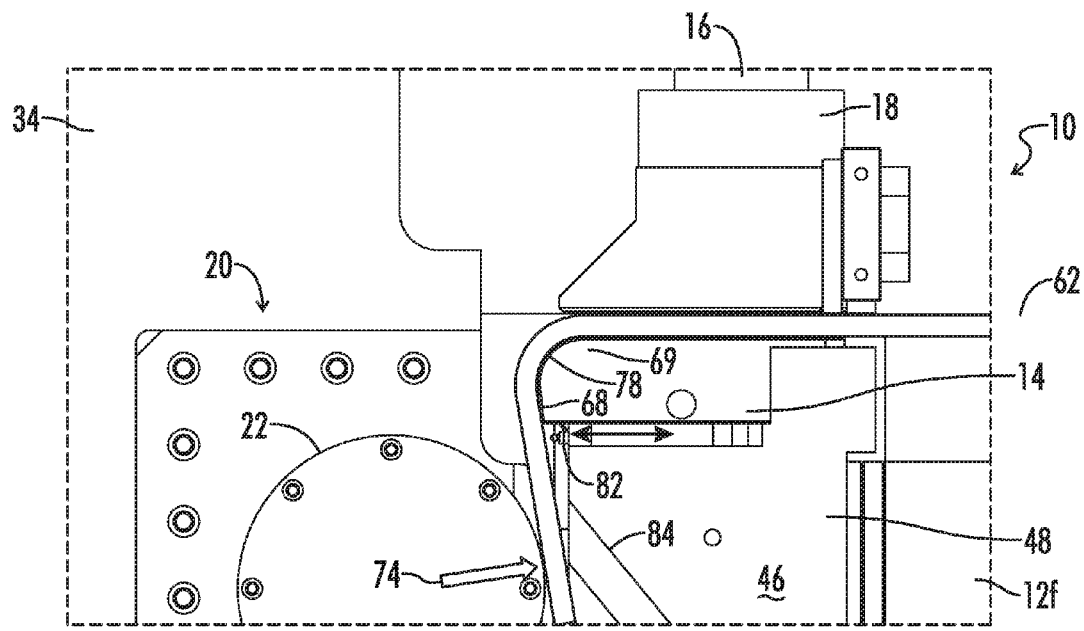
FIG. 13 is a detailed side view of the bending apparatus of FIG. 12 showing the bend roller forcing the work piece to bend in a horizontal direction past the desired bend orientation.

In some embodiments, as shown in FIGS. 12 and 13, it can be desirable to produce a bend in the work piece 62 that is substantially equal to ninety degrees or a bend past ninety degrees. In metal plates having thicknesses that are greater than or equal to ⅜ of an inch, the plate can have spring like characteristics, such that once the bending force 74 is removed, the work piece 62 will experience some level of spring back. As such, in order to bend the work piece 62 such that the work piece 62 maintains a desired ninety degree bend, the work piece 62 must be bent past a ninety degree angle. For such bends, once the bending roller 22 is past the bending anvil 14 such that the work piece 62 is placed in a ninety degree orientation, the second press actuator can be engaged to move the bending roller 22 in a substantially horizontal direction to bend the work piece 62 past the 90 degree orientation, such that the work piece 62 can spring back to a 90 degree orientation once the bending force 74 is removed. As the work piece 62 is bent past a ninety degree orientation, the work piece 62 can extend into the gap 46 between the bending anvil supports 12f on the press frame 12. The bending anvil 14 can have an angled or notched lower distal edge such that the work piece 62 can smoothly bend around the lower edge of the bending anvil 14 past a ninety degree orientation without forming a sharp bend in the work piece 62. Additionally, in some embodiments, the anvil holder 48 can include a notch or recess 84 to allow for the work piece 62 to extend past a ninety degree orientation and into the gap 46 between the bending anvil supports 12f without interference from the anvil holder 48.

In some embodiments, the distal end 69 of the bending anvil 14 can be rounded to produce a rounded bend in the work piece 62. In some embodiments, the bending press unit 20 can be operable to move the bending roller 22 during at least a portion of the bending operation in a circular or angled path by actuating the first and second press actuators simultaneously to produce simultaneous movement of the bending roller 22 in both a horizontal and a vertical direction. The speed of the first and second press actuators can be designed and programmed via a controller to produce a desired bending roller path 80 of the bending roller 22, the bending roller path 80 generally conforming or contouring the curvature of the distal end 69 of the bending anvil 14 or the rounded outer surface 78 of the bending anvil 14. As such, during the bending operation, an offset distance or moment arm 76 between the circumferential edge 72 of the bending roller 22 engaging the work piece 62 and the bending anvil 14, and particularly the bending point 68 on the bending anvil 14 from which the work piece 62 is cantilevered from, can be maintained as the bending roller 22 passes proximate the bending anvil 14. Such a bending roller path 80 shaped to conform to the bending anvil 14 can help produce consistent bending characteristics and stresses on the work piece 62 throughout the bending operation.

Referring again to FIG. 10, in some embodiments, because the bending force 74 being applied on the work piece 62 at a location that produces a moment arm 76 that is relatively small, the bending force 74 applied on the work piece 62 via the bending roller 22 and the bending press unit 20 can be at least 100,000 pounds in order to produce enough leverage and a sufficient moment on the work piece 62 to effectively bend the work piece 62. In some embodiments, the bending force 74 applied on the work piece 62 via the bending roller 22 can be at least 150,000 pounds. In some embodiments, the bending force 74 applied on the work piece 62 via the bending roller 22 can be at least 200,000 pounds. Additionally, the clamp press 16 can be operable to produce at least a 100,000 pound clamping force 70 on the work piece 62 when the clamp press 16 is actuated to clamp the work piece 62 against the bending anvil 14. In other embodiments, the clamp press 16 can be operable to produce at least a 150,000 pound clamping force 70 on the work piece 62. In other embodiments, the clamp press 16 can be operable to produce at least a 200,000 pound clamping force 70 on the work piece 62. A large clamping force 70 is needed to counteract the large bending force 74 applied to the work piece 62 by the bending roller 22.

While conventional bending machines used to bend thicker metal plates apply a bending force further away from a bending point on the bending anvil to help reduce the amount of bending force and thus the energy required to effectively bend the thicker metal plates, such a bending method can allow for distortion of the metal plate during the bending process. To combat this problem, the bending apparatus 10 of the current disclosure goes against conventional methods and applies a substantially larger bending force on the work piece 62 via the bending roller 22 at a location closer to the bending point 68 on the bending anvil 14, in an effort to help produce a more consistent, uniform profile of the metal plate at the bend location without distortion or deformation of the work piece 62 at the bend site.

Figure 15:
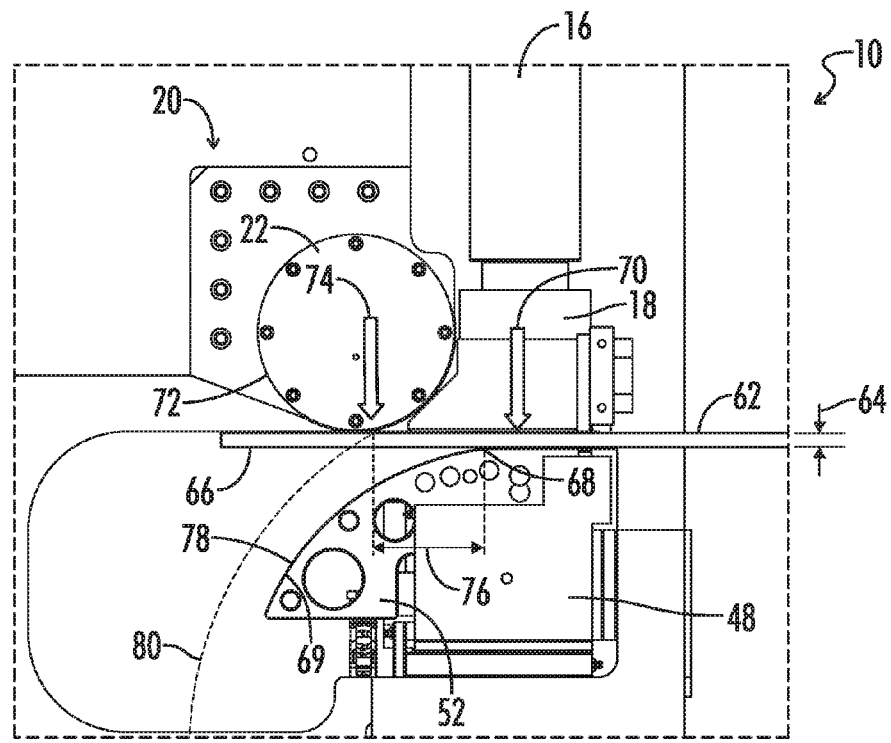
FIG. 15 is a detailed side view of the bending apparatus of FIG. 14 with a bending roller in an initial engagement position with the work piece during a bending operation.
Figure 16:
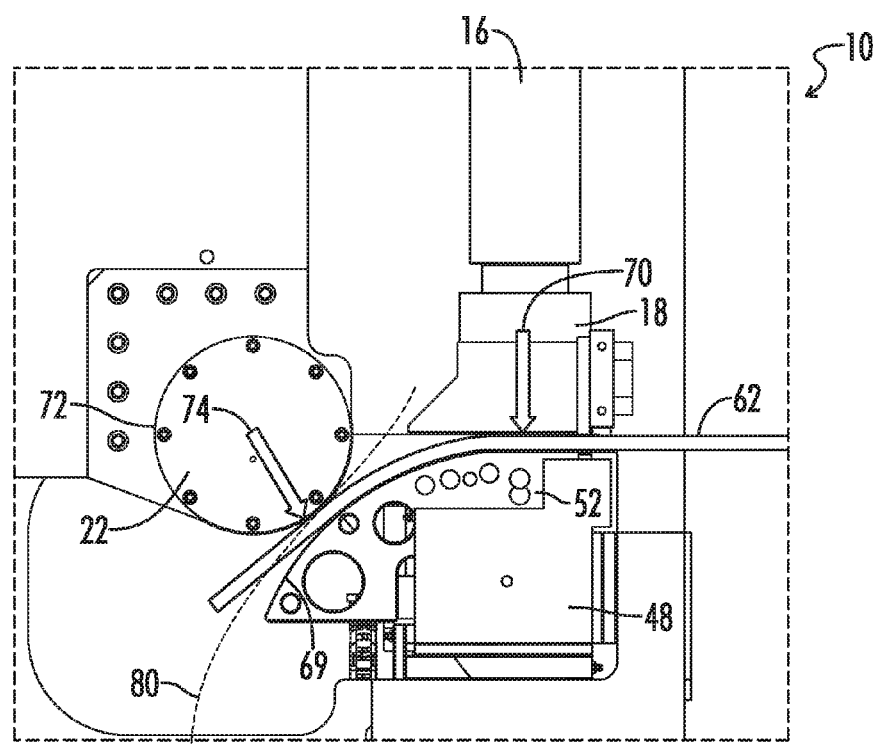
FIG. 16 is a detailed side view of the bending apparatus of FIG. 15 with the bend roller in an intermediate engagement position with a partially bent work piece during the bending operation.
Figure 17:
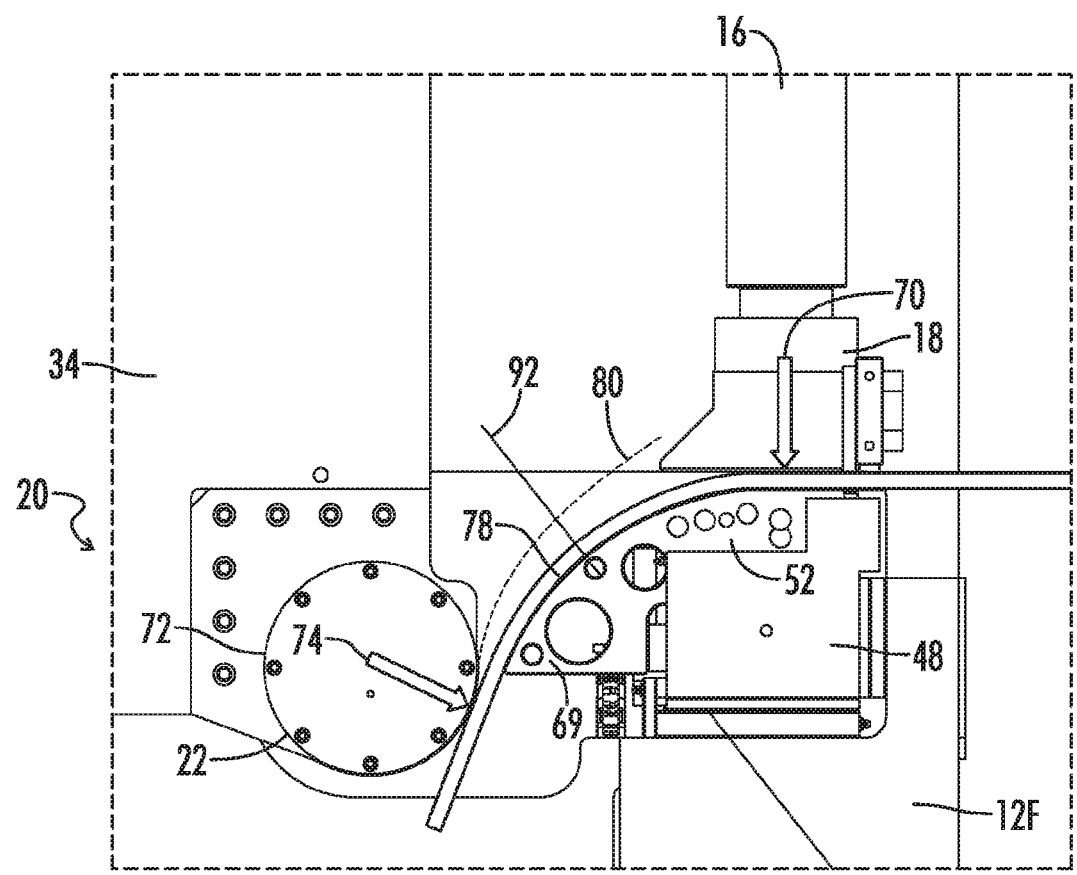
FIG. 17 is a detailed side view of the bending apparatus of FIG. 16 with the bending roller in a lower engagement position with a bent work piece during the bending operation.

A bending operation using the second bending anvil 52 is shown in FIGS. 15-17. The second bending anvil 52 in some embodiments can be shaped to produce a bend in a work piece positioned on the second bend anvil 52 having a radius of about three inches, the bend being less than a ninety degree bend. A work piece 62 is similarly positioned over the second bending anvil 52 and the clamp pad 18 of clamp press 16 can apply a clamping force 70 against the work piece 62 to clamp the work piece 62 against the second bending anvil 52. The bending press unit 20 can then be actuated to apply a bending force 74 on the work piece 62 via bending roller 22. A circumferential surface 72 of the bending roller 22 can engage the work piece 62 during the bending operation, the bending roller 22 rolling down the work piece 62 as the work piece is bent. The bending force 74 can produce a moment arm 76 on the work piece 62 about a bending point 68 on the second bending anvil 52. In some embodiments, the moment arm 76 can be less than 3 inches during the bending operation when the bending roller 22 is proximate the bending anvil 14.

As can be seen from FIGS. 15-17, the bending press unit 20 can move the bending roller 22 in some embodiments in both a horizontal and a vertical direction during the bending process to move the bending roller 22 along a bending roller path 80, a portion of which is curved or angled. The bending roller path 80 at the curved or angled portion of the path can generally conform to the shape of the outer rounded surface 78 of the second bending anvil 52.

While the bending processes shown in FIGS. 9-17 show two exemplary bending anvils 14 and 52 and bending roller path 80 corresponding to the shape of the bending anvils 14 and 52 shown, in other embodiments a variety of bending anvils having various shapes and sizes can be used on the bending apparatus, and the bending press unit 20 can be operable to move the bending roller 22 along various paths conforming to the various bending anvils. In some embodiments, a controller for the bending apparatus can be preprogrammed or preloaded with various bending anvil configurations such that a user can select the desired anvil configuration and the controller will be programmed to produce the desired bending roller 22 path for the bending roller via the bending press unit 20.

Additionally, while the bending processes shown in FIGS. 9-17 include moving the bending roller 22 along a curve or angled path, in other embodiments the first press actuator can generally move the bending roller 22 in an initial vertical direction to bend the work piece 62 about the bending anvil 14 initially, the bending force 74 producing a moment arm 76 on the work piece 62 about the successive bending points on the bending anvil 14 that remains less than about 3 inches as the bending roller 22 passes proximate to the bending anvil 14 or 52, though the length of the moment arm 76 can vary during the bending operation. If it is desired to bend the work piece 62 past a ninety degree angle, the bending roller 22 can be moved horizontally at the completion of the vertical motion via the second press actuator to bend the work piece 62 past a ninety degree angle, such that the path of the bending roller is generally L-shaped.

In some embodiments, bending apparatus 10 can be equipped with a bend sensor 82, as shown in FIG. 13. The bend sensor 82 can generally be positioned beneath the bending anvil 14. The bend sensor 82 can be operable to selectively determine a bend orientation of a work piece 62 during a bending operation. In some embodiments, the bend sensor 82 can be configured to measure a particular bend angle of the work piece 62. For instance, in some embodiments where a ninety degree bend orientation is desired, the bend sensor 82 can be a pneumatic piston sensor orientated on the anvil holder 48 beneath the bending anvil 14 in a substantially horizontal direction. The piston sensor 82 can be selectively actuated to extend the piston out and against the work piece 62 being bent. The piston sensor 82 can determine the displacement of the piston to measure whether the work piece 62 is oriented at a desired ninety degree angle. In some embodiments, the bending method can include repeatedly bending the work piece 62 in a horizontal direction with the bending roller 22 past a ninety degree orientation and taking measurements between successive horizontal bends of the work piece 62 to determine if the work piece 62 has achieved a desired ninety degree orientation. Once the desired ninety degree bend angle in the work piece 62 is achieved, the bending operation would be complete, and the bending roller 22 can be returned to an initial position above the bending anvil 14.

In some embodiments including a pneumatic piston sensor 82 positioned on an anvil holder 48, the anvil holder 48 can include a pneumatic line channel extending through the anvil holder 48 and to the bend sensor 82. In those embodiments where anvil holder 48 is movable on the press support frame 12, and particularly on anvil support extension 12e, as shown in FIG. 7, the support frame 12 can include a pneumatic line guide track 86. A pneumatic line 88 can extend through the pneumatic line guide track 86 and into the anvil holder 48 and be fluidly connected to the bend sensor 82. The pneumatic guide track 86 can include a plurality of sections, such as chain links, pivotally linked together. The sections of the pneumatic guide track 86 can be made from any suitable material, including but not limited to metal, plastic, polymer, or composite material, etc. As the anvil holder 48 moves on the anvil support extension 12e, the pneumatic line guide track 86 can bend into itself to maintain a suitable curvature for the pneumatic line 88 contained therein to help prevent the pneumatic line 88 from crimping or becoming otherwise damaged during movement of the anvil holder 48.

Figure 18:
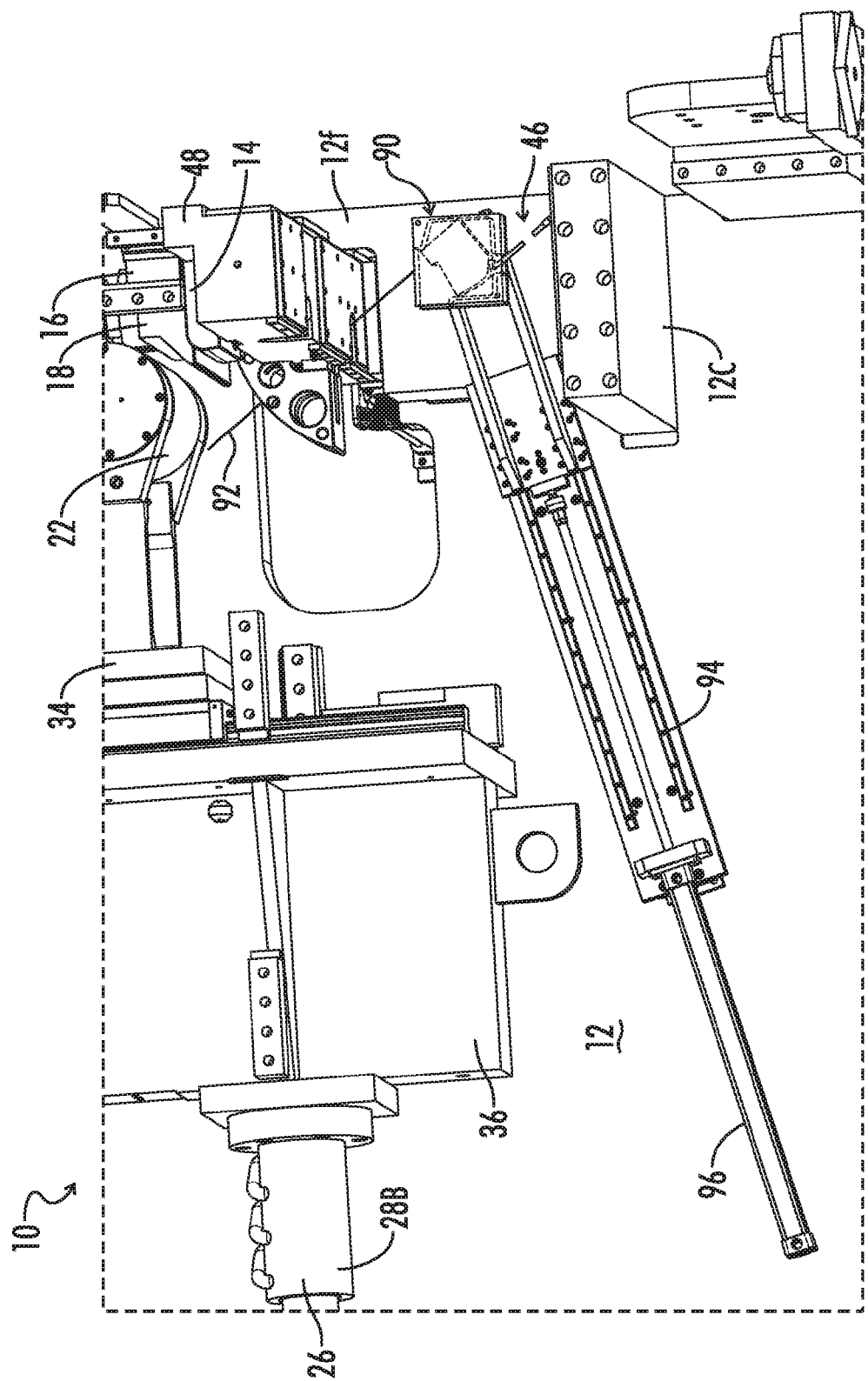
FIG. 18 is a detailed perspective view of the bending apparatus of FIG. 8 showing a laser measurement unit movably disposed on a press support frame, the laser measurement unit positioned beneath the second bending anvil.
Figure 19:
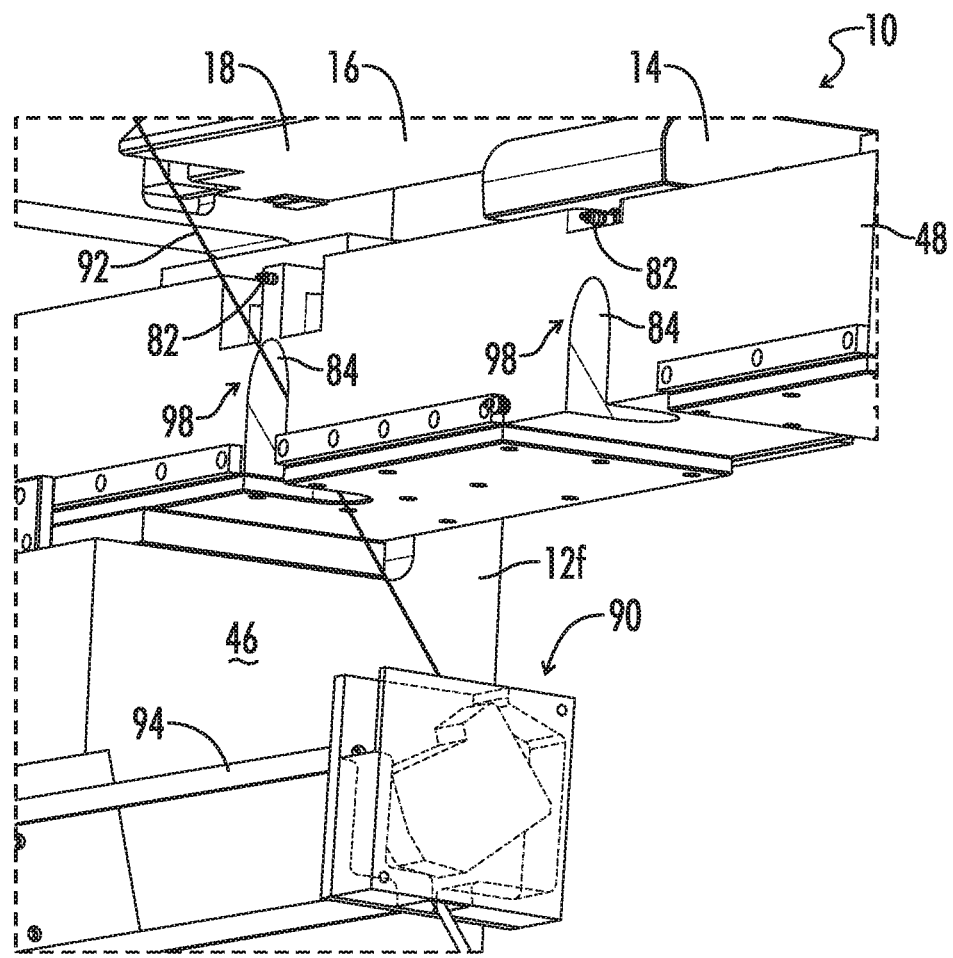
FIG. 19 is a detailed view of the laser measurement unit of FIG. 18 emitting a measurement laser through a laser aperture in an anvil holder.

In some embodiments, the bending apparatus 10 can include a bend sensor 82 that is capable of measuring a plurality of bend angles of a work piece 62 being bent on the apparatus 10. For instance, in one embodiment, as shown in FIGS. 3 and 18-19, the bend sensor can be a laser measurement unit 90. The laser measurement unit 90 can be positioned to selectively emit a laser 92 towards the work piece 62 being bent on the bending apparatus 10. The laser measurement unit 90 can continuously measure the bend angle of a work piece 62 being bent by the apparatus 10 via the laser 92, as shown in FIG. 17. The laser measurement system can be programmed to recognize when the work piece 62 reaches a desired bend angle.

Referring again to FIGS. 3 and 18, in some embodiments, the laser measurement unit 90 can be movably disposed on the press support frame 12, wherein the laser measurement unit 90 is selectively movable to a position beneath the bend anvils 14 and/or 52. In one embodiment, the laser measurement unit 90 is mounted to a laser measurement unit rail assembly 94. A laser measurement unit actuator 96 can be mounted to the press support frame 12 and coupled to the laser measurement unit 90. The laser measurement unit actuator 96 can be operable to move the laser measurement unit 90 on the laser measurement unit rail assembly 94 between a retracted position and an extended position with the laser measurement unit 90 positioned beneath the bending anvil 14 and/or 52 and within the gap 46 between bending anvil supports 12f. The laser measurement unit 90 being movable on the laser measurement rail assembly 94 can allow the laser measurement unit 90 to be moved out of the way between successive bending operations as a work piece is repositioned on the apparatus 10 in order to facilitate repositioning of the work piece without interference from the laser measurement unit 90, and to help prevent unintended damage to the laser measurement unit 90 as the work piece is being repositioned on the apparatus 10.

In some embodiments, bending apparatus 10 can include either the pneumatic piston bend sensor 82 shown in FIG. 13, or the laser measurement unit 90 bend sensor shown in FIGS. 3 and 18. In other embodiments, the bending apparatus 10 can include both the pneumatic piston sensor 82 shown in FIG. 13 and the laser measurement unit 90 bend sensor shown in FIGS. 3 and 18, such that the bending apparatus can be used to accurately measure both ninety degree and non-ninety degree bends in the work pieces as desired.

In some embodiments, as shown in FIG. 19 (with the second bending anvil removed, the anvil holder 48 can include multiple bending anvil stations 98 for different bending anvils positioned on the anvil holder 48. Each bending station 98 can include a pneumatic piston sensor 82 for determining ninety degree bends in a work piece when desired. A laser aperture or recess 84 can be positioned below each pneumatic piston sensor 82. When the laser measurement unit 90 is positioned beneath a bending anvil station 98, as shown in FIG. 19, the laser 92 from the laser measurement unit 90 can extend through the laser aperture or recess 84 such that the laser 92 can measure the bending angle of a work piece being bent by the apparatus 10 without interference from the anvil holder 48. As shown in FIG. 7, bending anvils 52 used for non-ninety degree bends can include an anvil laser aperture 106 through which the laser 92 from laser measurement unit 90 can extend to engage the work piece when the bending anvil 52 is used in conjunction with the laser measurement unit 90. As such, each anvil station 98 can be used for anvils designed for ninety degree, or past ninety degree bends, where the pneumatic sensor 82 can be utilized to measure the bend angle, and for anvils designed for making less than ninety degree bends, where the laser measurement unit 90 can be utilized to measure the bend angle of the work piece being bent. Such a configuration of the anvil holder 48 can make different bending anvils freely interchangeable between docking stations 98 such that the bending apparatus 10 and the bending anvils on the anvil holder 48 can be tailored to the user's liking.

Figure 21:
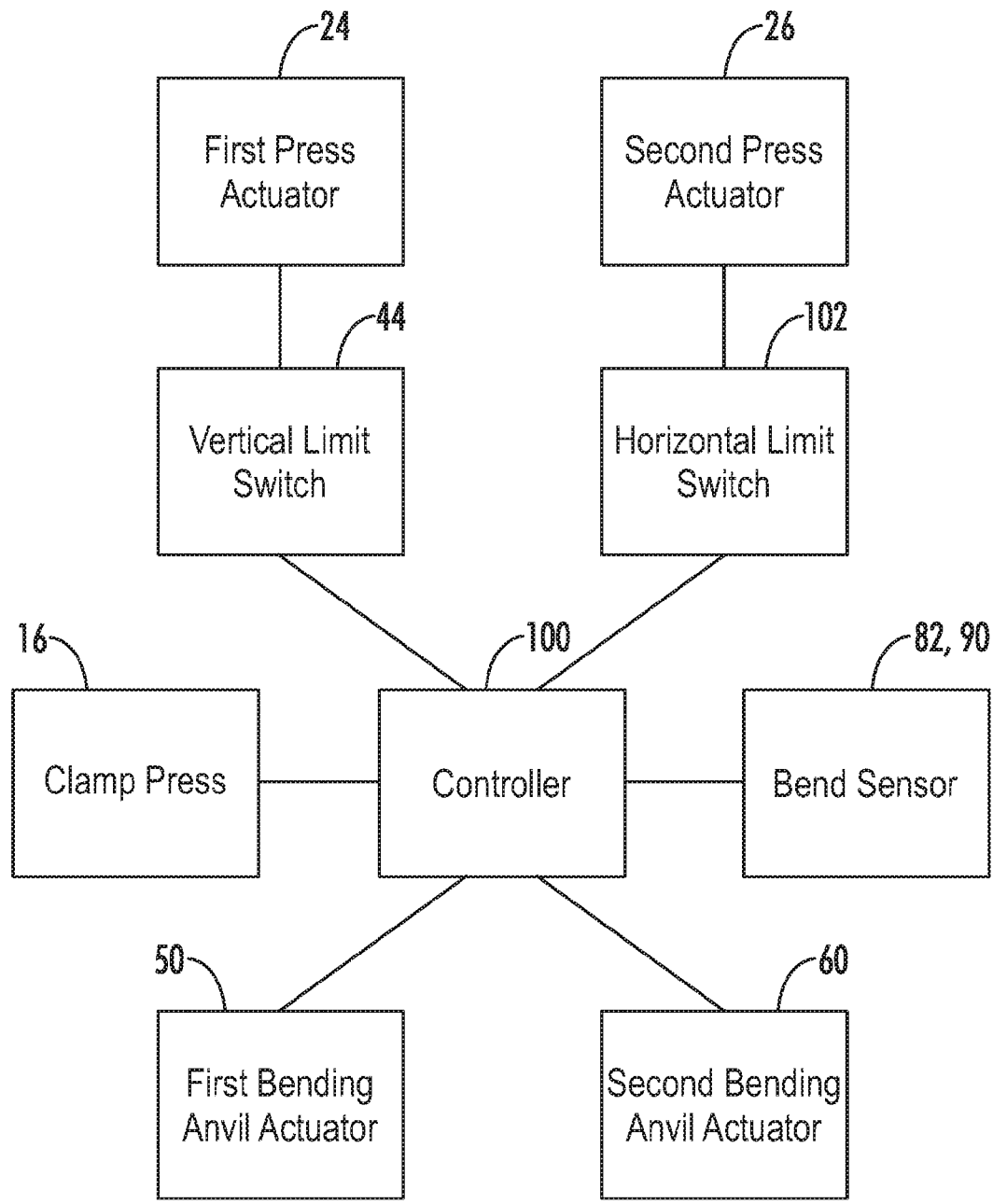
FIG. 21 is a schematic diagram of a controller system for the bending apparatus of FIGS. 1-3.

Referring now to FIG. 21, in some embodiments, the bending apparatus 10 can include a controller 100 operable to control the first and second bending anvil actuators 50 and 60, the first and second press actuators 24 and 26, the vertical and horizontal limit switches 44 and 102 monitoring the positions of the bending roller support and the roller support frame respectively, the clamp press 16, and the bend sensor 82. The controller 100 can be actuated by the user to actuate one or more of the first and second bending anvil actuators to move the anvil holder and place either the first or second bending anvils in a bending position beneath the clamp press 16. The controller 100 can then actuate the clamp press to clamp a work piece on the bending anvil when desired. Once the bending operation begins, the controller 100 can be programmed to actuate the first and second press actuator 24 and 26, either sequentially or simultaneously, to produce a desired bending path for the bending roller during the bending operation to effectively bend a work piece on the apparatus 10 about a bending anvil. In some embodiments, the controller 100 can be programmed to operate the first and second press actuators simultaneously to produce a curved or angled bending path for the bending roller that conforms to the shape of the rounded distal end of the bending anvil. The controller 100 can receive feedback from the vertical limit switch 44, the horizontal limit switch 102, and the bend sensor 82 (the pneumatic piston sensor and/or the laser measurement unit 90) to monitor the position of the bending press unit and the bending angle of the work piece on the apparatus 10. As such, once a work piece is clamped to a bending anvil on the apparatus 10, the controller 100 can be programmed to control and monitor the bending press unit during the bending process autonomously.

Figure 20:
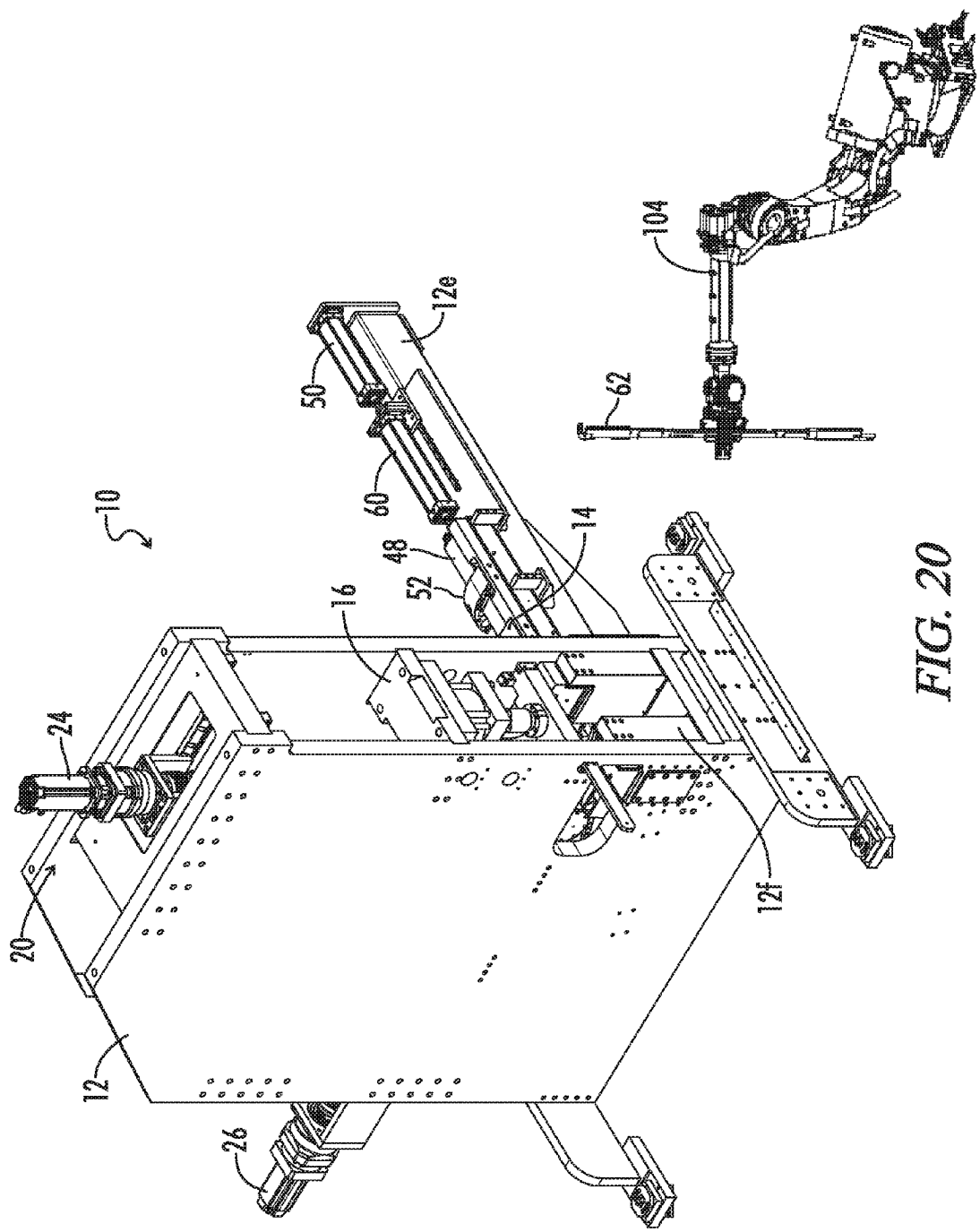
FIG. 20 is a detailed view of another embodiment of a bending apparatus of the present disclosure including a robotic arm for manipulating a work piece on the bending apparatus.

Additionally, in some embodiments, as shown in FIG. 20, the bending apparatus 10 can include a robotic arm 104 that can be programmed to engage or grasp a work piece 62 and place the work piece 62 in a desired position on the bending apparatus 10. In some embodiments, the robotic arm 104 can be programmed to reposition the work piece after successive bends such that the robotic arm 104 can automatically reposition the work piece through sequential bends to produce an overall product having multiple bends. The robotic arm 104 is designed to provide six degrees of motion for a work piece grasped by the robotic arm 104 which is particularly beneficial for more complex designs having multiple bends which require significant movement and repositioning of the work piece 62 between successive bends. In some embodiments, a work piece guide table can be positioned adjacent the robotic arm 104, the work piece guide table including one or more guides for positioning a work piece on the guide table such that the robotic arm 104 can grasp the work piece at a desired position from the guide table to effectuate the work piece orientations on the bending apparatus 10 to produce the desired bends in the product.

In some embodiments, the robotic arm 104 can include minimal hydraulic, pneumatic or electrical lines extending toward a distal end of the robotic arm 104. Such a reduction of lines going towards the distal end of the robotic arm 104 can help reduce interference between the work piece 62 grasped by the robotic arm 62 and the lines providing power or movement to the robotic arm 104 as the work piece 62 is repositioned and reoriented by the robotic arm 104, which is particularly beneficial for long work pieces 62 needing to be moved in multiple directions during the various bending processes. Furthermore, in some embodiments, the robotic arm 104 and the controller on the bending apparatus 10 can be wirelessly communicated to further reduce the presence of cables or lines running to the robotic arm 104. In other embodiments, the work piece 62 can be manually manipulated between each bend cycle to place the work piece 62 in various desired positions on the bending apparatus 10.

In some embodiments, the controller can be communicated with the robotic arm 104 to control the robotic arm in conjunction with the bending operation performed by the apparatus. For instance, the controller can initially place the bending anvil actuators in a retracted position to remove the anvil holder 48 and the bending anvils from the bending anvil supports 12f. The robotic arm 104 can then place the work piece 62 in a desired orientation within bending apparatus 10 between bending anvil supports 12f. The controller can then actuate one or more of the bending anvil actuators to place a bending anvil beneath the work piece 62. The controller can then actuate the clamp press 16 and the first and second press actuators 24 and 26 of the bending press unit 20 to perform a first bend. Upon completion of the first bend, the clamp press 16 can be retracted, the anvil holder 48 and the bending anvils 14 and 52 thereon can be retracted, and the robotic arm 104 can remove the work piece from the bending apparatus and reposition the work piece 62 on the bending apparatus 10 for the next bend, wherein the process is repeated until the finished product is produced.

Another aspect of the present disclosure is a method for bending a metal work piece, the method comprising the steps of (a) providing a bending apparatus including a press support frame, a bending anvil disposed on the support frame, a clamp press mounted to the press support frame; and a bending press unit movably mounted to the press support frame, the bending press unit including a bending roller rotatably disposed on the bending press unit; (b) placing a work piece on the bending anvil with an end of the work piece cantilevered from a distal end of the bending anvil, the work piece having a thickness of at least about ⅜ of an inch; (c) clamping the work piece to the bending anvil with the clamp press, the clamp press applying a clamping force of at least about 100,000 pounds on the work piece; and (d) bending the work piece around the distal end of the bending anvil with the bending roller of the bending press unit, the bending roller rolling down the work piece as the work piece is bent, wherein the bending press unit applies a bending force on the work piece via the bending roller of at least 100,000 pounds, the bending force producing a moment arm about a point on the distal end of the bending anvil from which the work piece is cantilevered, the moment arm having a length that is less than or equal to about 3 inches.

In some embodiments, the bending press unit can include a first press actuator operable to move the bending roller in a vertical direction and a second press actuator operable to move the bending roller in a horizontal direction. In such embodiments, the method can further include actuating the first press actuator and the second press actuator to move the bending roller in multiple directions during the bending step. In some embodiments, the first and second press actuators can be actuated simultaneously to produce a curved bending path for the bending roller. In still other embodiments, the method can include moving a bending anvil into position beneath the clamp press prior to the clamping step. In other embodiments, after the bending step the method can include measuring the bend angle of the work piece via a bend sensor positioned beneath the bending anvil, and further bending the work piece as needed.

Thus, although there have been described particular embodiments of the present invention of a new and useful METAL PLATE BENDING APPARATUS, it is not intended that such references be construed as limitations upon the scope of this invention.

What is claimed is:

1. An apparatus for bending a metal work piece, the apparatus comprising:
    a press support frame;
    a bending anvil disposed on the press support frame;
    a clamp press mounted to the press support frame, the clamp press positioned to selectively clamp the work piece over the bending anvil when the work piece is positioned on the bending anvil, the clamp press operable to apply a clamping force of at least 100,000 pounds on the work piece; and
    a bending press unit mounted to the press support frame, the bending press unit including a bending roller oriented to engage the work piece during a bending operation when the work piece is clamped over the bending anvil;
    wherein the bending press unit is operable to move the bending roller with respect to the press support frame in a first direction and a second direction, the first direction being substantially perpendicular to the second direction.

2. The apparatus of claim 1, wherein the bending press unit further comprises:
    a first press actuator operable to selectively move the bending roller in the first direction; and
    a second press actuator operable to selectively move the bending roller in the second direction.

3. The apparatus of claim 2, further comprising a controller operably coupled to the first press actuator and the second press actuator, wherein during a bending operation, the controller is programmed to actuate the first and second press actuators simultaneously such that the bending roller moves along a curved bending roller path.

4. The apparatus of claim 2, wherein the first and second press actuators are ball screw press actuators.

5. The apparatus of claim 1, wherein the bending press unit further comprises:
    a bending roller support, the bending roller rotatably disposed on the bending roller support;
    a roller support frame movably mounted to the press support frame; the bending roller support movably disposed on the roller support frame;
    wherein the bending roller support is movable relative to the roller support frame in the first direction and the roller support frame is movable relative to the press support frame in the second direction.

6. The apparatus of claim 5, further comprising:
    a first press actuator mounted to the roller support frame and coupled to the bending roller support, the first press actuator operable to move the bending roller support and the bending roller relative to the roller support frame in the first direction; and a second press actuator mounted to the press support frame and coupled to the roller support frame, the second press actuator operable to move the roller support frame, the bending roller support, and the bending roller relative to the press support frame in the second direction.

7. The apparatus of claim 1, further comprising a bend sensor positioned beneath the bending anvil, the bend sensor operable to selectively determine the orientation of the work piece during the bending operation of the apparatus.

8. The apparatus of claim 7, wherein the bend sensor is movably disposed on the press support frame, the bend sensor selectively movable to a position beneath the bending anvil.

9. The apparatus of claim 1, further comprising:
an anvil holder slidably disposed on the press support frame, the bending anvil mounted to the anvil holder, the bending anvil disposed on the press support frame via the anvil holder;
wherein the anvil holder can slide on the press support frame to move the bending anvil to and from a bending position generally beneath the clamp press.

10. The apparatus of claim 9, further comprising a second bending anvil mounted to the anvil holder, the anvil holder movable on the press support frame to position either the bending anvil or the second bending anvil beneath the clamp press.

11. The apparatus of claim 10, further comprising:
a first bending anvil actuator disposed on the press support frame; and
a second bending anvil actuator disposed on the press support frame;
wherein the first bending anvil actuator is operable to move the anvil holder on the press support frame such that the bending anvil is positioned beneath the clamp press; and
wherein the second bending anvil actuator is further operable to move the anvil holder such that the second bending anvil is positioned beneath the clamp press.

12. The apparatus of claim 11, wherein the first and second bending anvil actuators are pneumatic pistons.

13. The apparatus of claim 10, wherein the bending anvil and the second bending anvil are interchangeably mounted to the anvil holder.

14. The apparatus of claim 1, wherein the bending press unit is operable to apply a bending force on the work piece clamped over the bending anvil via the bending roller of at least 100,000 pounds.

15. An apparatus for bending a metal work piece, the apparatus comprising:
a press support frame;
a bending anvil movably disposed on the support frame;
a clamp press mounted to the press support frame, the clamp press positioned to selectively clamp the work piece over the bending anvil when the bending anvil is positioned beneath the clamp press and the work piece is positioned on the bending anvil; and
a bending press unit mounted to the press support frame, the bending press unit including a bending roller oriented to engage the work piece during a bending operation when the work piece is clamped over the bending anvil;
wherein the bending press unit includes a first press actuator and a second press actuator, the first press actuator operable to move the bending roller with respect to the press support frame in a vertical direction, the second press actuator operable to move the bending roller with respect to the press support frame in a horizontal direction.

16. The apparatus of claim 15, further comprising a laser measurement unit slidably disposed on the press support frame, the laser measurement unit selectively movable to a position beneath the bending anvil.

17. The apparatus of claim 15, further comprising:
the bending anvil having a rounded distal end; and
a controller operably connected to the first and second press actuators;
wherein the controller is programmed to operate the first and second press actuators simultaneously to produce a curved path for the bending roller during a bending operation of the apparatus, the curved bending path for the bending roller conforming to the shape of the rounded distal end of the bending anvil.

18. A method for bending a metal work piece, the method comprising the steps of:
(a) providing a bending apparatus including:
a press support frame;
a bending anvil disposed on the support frame;
a clamp press mounted to the press support frame; and
a bending press unit movably mounted to the press support frame, the bending press unit including a bending roller rotatably disposed on the bending press unit;
(b) placing a work piece on the bending anvil with an end of the work piece cantilevered from a distal end of the bending anvil, the work piece having a thickness of at least about 3/8 of an inch;
(c) clamping the work piece to the bending anvil with the clamp press, the clamp press applying a clamping force of at least about 100,000 pounds on the work piece;
(d) bending the work piece against the distal end of the bending anvil with the bending roller of the bending press unit, the bending roller rolling down the work piece as the work piece is bent, wherein the bending press unit applies a bending force on the work piece via the bending roller of at least 100,000 pounds, the bending force producing a moment arm about a point on the distal end of the bending anvil from which the work piece is cantilevered, the moment arm having a length that is less than or equal to about 3 inches.

19. The method of claim 18, wherein:
the bending press unit includes a first press actuator operable to move the bending roller in a vertical direction and a second press actuator operable to move the bending roller in a horizontal direction; and
the bending step includes actuating the first press actuator and the second press actuator to move the bending roller in multiple directions during the bending step.

* * * * *